(12) United States Patent
Rau

(10) Patent No.: US 11,202,689 B2
(45) Date of Patent: Dec. 21, 2021

(54) COMBINATION, SYSTEM; HOLDING MEANS; DENTAL TOOL AND DENTAL SET

(71) Applicant: Hartmut Rau, Wuppertal (DE)

(72) Inventor: Hartmut Rau, Wuppertal (DE)

(*) Notice: Subject to any disclaimer, the term of this patent is extended or adjusted under 35 U.S.C. 154(b) by 486 days.

(21) Appl. No.: 16/062,678

(22) PCT Filed: Dec. 16, 2016

(86) PCT No.: PCT/EP2016/081587
§ 371 (c)(1),
(2) Date: Aug. 23, 2018

(87) PCT Pub. No.: WO2017/103212
PCT Pub. Date: Jun. 22, 2017

(65) Prior Publication Data
US 2019/0000591 A1    Jan. 3, 2019

(30) Foreign Application Priority Data
Dec. 18, 2015  (DE) .................. 10 2015 122 199.3

(51) Int. Cl.
*A61C 5/82* (2017.01)
*A61C 8/00* (2006.01)

(52) U.S. Cl.
CPC .............. *A61C 5/82* (2017.02); *A61C 8/008* (2013.01); *A61C 8/0089* (2013.01)

(58) Field of Classification Search
CPC ......... A61C 5/82; A61C 8/008; A61C 8/0089; A61C 5/80
USPC .................................................... 433/38, 40
See application file for complete search history.

(56) References Cited

U.S. PATENT DOCUMENTS

| 741,890 A | * | 10/1903 | Craigie | ................ A61C 5/82 |
| | | | | 433/136 |
| 2,958,946 A | * | 11/1960 | Chertkof | .............. A61C 9/00 |
| | | | | 433/40 |
| 3,151,393 A | * | 10/1964 | Holmes | ............ A61C 9/0033 |
| | | | | 433/40 |

(Continued)

FOREIGN PATENT DOCUMENTS

| CN | 204536104 U | 8/2015 |
| DE | 102 34 550 A1 | 2/2004 |

(Continued)

OTHER PUBLICATIONS

Bicon Dental Implants, "Overdenture: Brevis Abutment", Jul. 3, 2014. Accessed at https://www.bicon.com/tech/t_od01.html (Year: 2014).*

(Continued)

*Primary Examiner* — Edward Moran
(74) *Attorney, Agent, or Firm* — Collard & Roe, P.C.

(57) ABSTRACT

A combination has an implant, a dental dam and a holding device for detachably holding the dental dam at an implant end portion of the implant. The holding device is formed of a circular ring which is closed on its periphery and which has a ring-clamping portion that extends around a ring through-opening. A system has a combination that has an implant, which is preferably a dental implant; a dental dam; and a holding device. A dental tool can be used for detachably fastening a dental dam to an implant via a holding device.

13 Claims, 34 Drawing Sheets

(56) References Cited

U.S. PATENT DOCUMENTS

| | | | | |
|---|---|---|---|---|
| 3,238,620 | A | * | 3/1966 | Robertson ............ A61C 9/0033 433/40 |
| 4,400,160 | A | * | 8/1983 | Lustig ................... A61C 5/40 433/136 |
| 4,483,675 | A | * | 11/1984 | Marshall ........... B05C 17/00593 433/141 |
| 7,316,429 | B2 | * | 1/2008 | Viegener ............... F16L 13/142 285/307 |
| 8,480,574 | B2 | * | 7/2013 | Li ........................... A61B 1/32 600/206 |
| 2003/0190584 | A1 | * | 10/2003 | Heasley ................. A61C 5/82 433/136 |
| 2004/0029073 | A1 | * | 2/2004 | Kilcher .................. A61C 5/82 433/136 |
| 2004/0209224 | A1 | * | 10/2004 | Heasley ................. A61C 5/82 433/139 |
| 2006/0210950 | A1 | * | 9/2006 | Fallah .................. A61C 8/0018 433/173 |
| 2006/0263742 | A1 | * | 11/2006 | Saliger ............... A61C 13/0004 433/72 |
| 2008/0090205 | A1 | | 4/2008 | Kilcher et al. |
| 2009/0053668 | A1 | * | 2/2009 | Kim ........................ A61C 5/82 433/29 |
| 2010/0117352 | A1 | * | 5/2010 | Felder .................. F16L 19/065 285/24 |
| 2016/0015480 | A1 | * | 1/2016 | Korwin .................. A61C 5/82 433/39 |
| 2017/0252117 | A1 | * | 9/2017 | Sanders ................. A61B 46/20 |
| 2017/0367790 | A1 | * | 12/2017 | Heymann .............. A61C 19/00 |
| 2018/0200026 | A1 | * | 7/2018 | Clark ...................... A61C 5/85 |

FOREIGN PATENT DOCUMENTS

| | | |
|---|---|---|
| DE | 103 12 329 A1 | 3/2004 |
| DE | 20 2006 001 276 U1 | 3/2006 |
| EP | 0 376 944 A1 | 7/1990 |
| EP | 1 593 899 A1 | 11/2005 |
| WO | 91/00723 A2 | 1/1991 |
| WO | 2010/021535 A2 | 2/2010 |

OTHER PUBLICATIONS

German Office Action in DE 10 2015 122 199.3 dated Oct. 7, 2016 with English translation of relevant parts.

http://dentalclinic-barcelona.com/behandlungen/implantologie/Aufbau1.jpg Retrieved from Internet on May 19, 2015.
http://magazin.halder.eu/de/halder/2013/wir-koennen-es-drehen-und-fraesen-wie-sie-wollen/Aufbau2.jpg Retrieved from Internet on May 19, 2015.
Aufbau 3.jpg Retrieved from Internet on May 19, 2015.
https://www.drgehrke.de/implantate.html, Aufbau4.jpg Retrieved from Internet on May 19, 2015.
http://www.bego.com/de/implantologie-loesungen/prothetik/ohne-platform-switch-design-zb-sri-implantate/multiplus-versorgung/Aufbau5.jpg Retrieved from Internet on May 19, 2015.
https://abutments4life.de/fachinformationen/Aufbau6/jpg Retrieved from Internet on May 19, 2015.
https://swiftdental.co.uk/lmpl.-Typ1.jpg Retrieved from Internet on May 19, 2015.
https://swiftdental.co.uk/lmpl.-Typ2.jpg Retrieved from Internet on May 19, 2015.
https://swiftdental.co.uk/lmpl.-Typ3.jpg Retrieved from Internet on May 19, 2015.
https://www.dentisti-italia.it/dentista/implantologia/142_limplantologia-del-terzo-millennio.html; http://www.zahnarzt-schkeuditz.de/lmpl-Typ4.jpg Retrieved from Internet on May 19, 2015.
http://www.signmadental.de/de/kofferdam/kofferdam_rahmen/ivory_edelstahlrahmen.php, Kofferdam1.jpg Retrieved from Internet on May 19, 2015.
http://hu.tutkrabov.net/articles/akut-traumas-fogbelgyulladas-okoz-tunetei-kezelese.html, Kofferdam2.jpg Retrieved from Internet on May 19, 2015.
Kofferdam 3.jpg Retrieved from Internet on May 19, 2015.
Kofferdam 4.jpg Retrieved from Internet on May 19,2015Retrieved from Internet on May 19, 2015.
http://www.zahnarzt-team-luzern.ch/wurzelbehandlung-behandlung.php, Kofferdam5.jpg Retrieved from Internet on May 19, 2015.
https://www.schmidt-dr.de/professionelle-amalgamsanierung/Kofferdam6.jpg Retrieved from Internet on May 19, 2015.
https://eddonline.de/product/0344570/kofferdam-lochzange-610, Lochzange1.jpg Retrieved from Internet on May 19, 2015.
Kofferdam-Lochzange Ivory, http://www.dentalinstrumente-shop.org/Kofferdam-Lochzange-Ivory, Lochzange2.jpg Retrieved from Internet on May 19, 2015.
Lochzange3.jpg https://www.sigmadental.de/extern/prospekte/sigma-kofferdam-de/files/assets/downloads/SIGM-12-231_Kofferdam_Produktfolder_Neuauflage.pdf Retrieved from Internet on May 19, 2015.
International Search Report of PCT/EP2016/081587, dated Aug. 4, 2017.

* cited by examiner

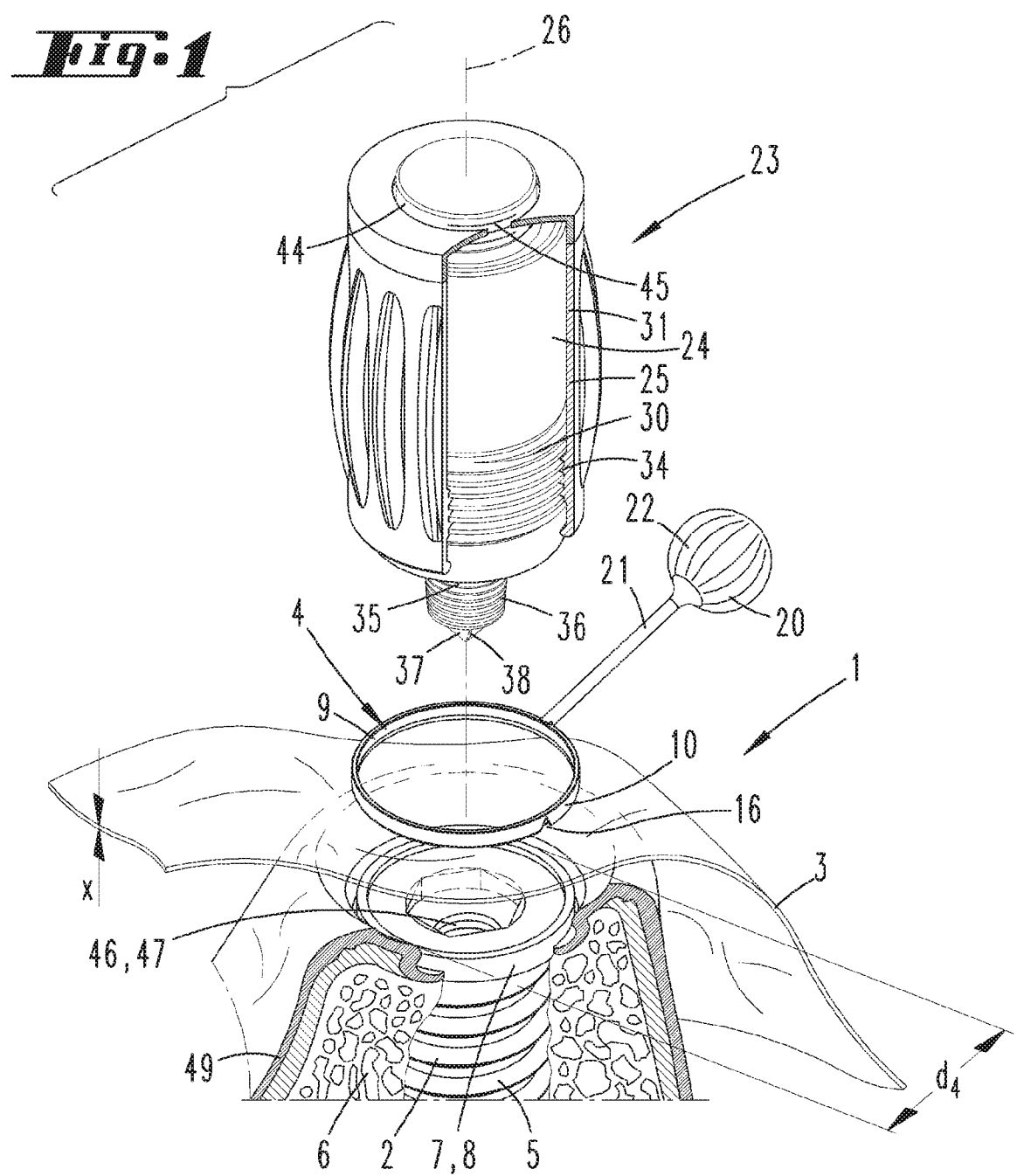

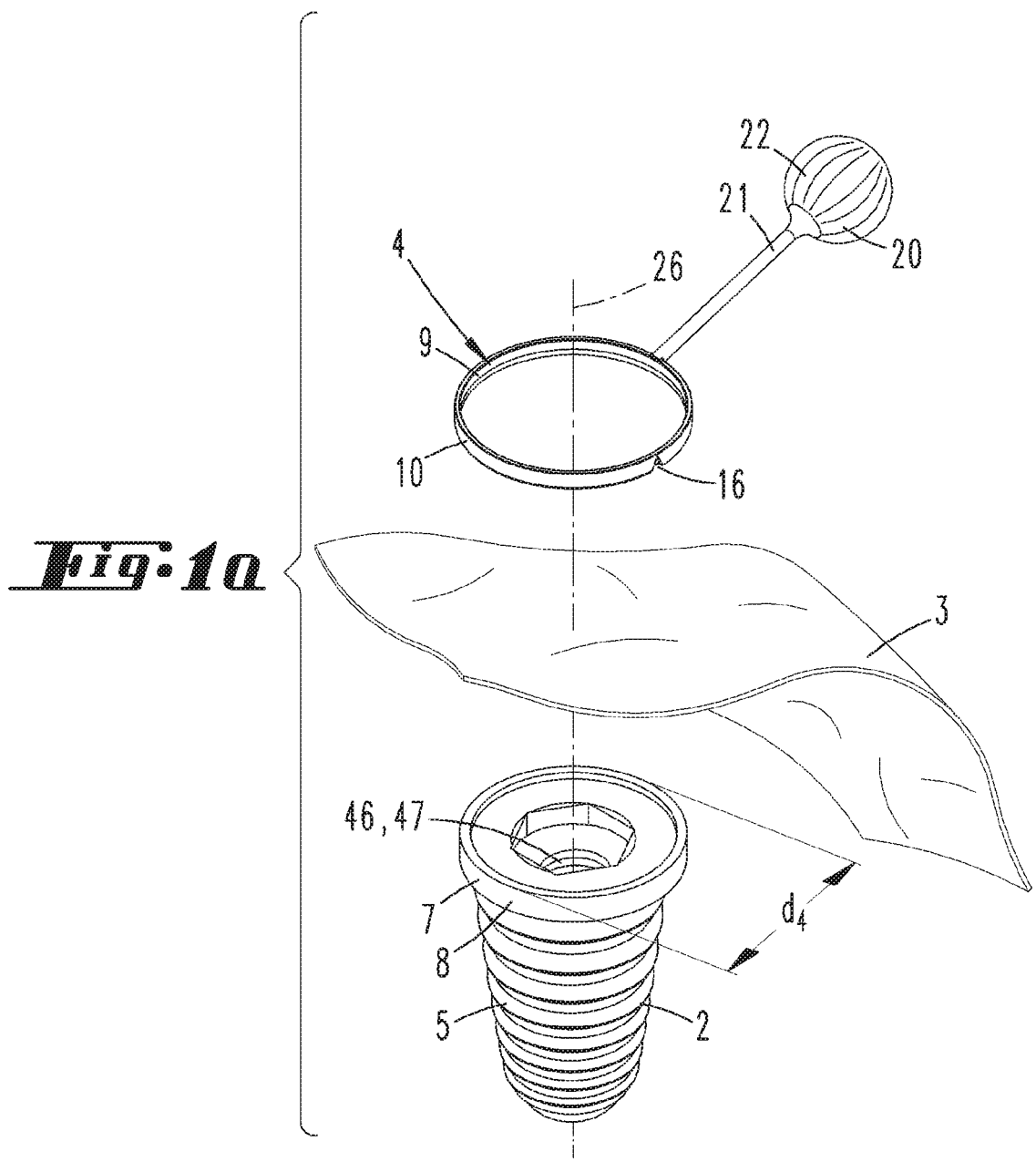

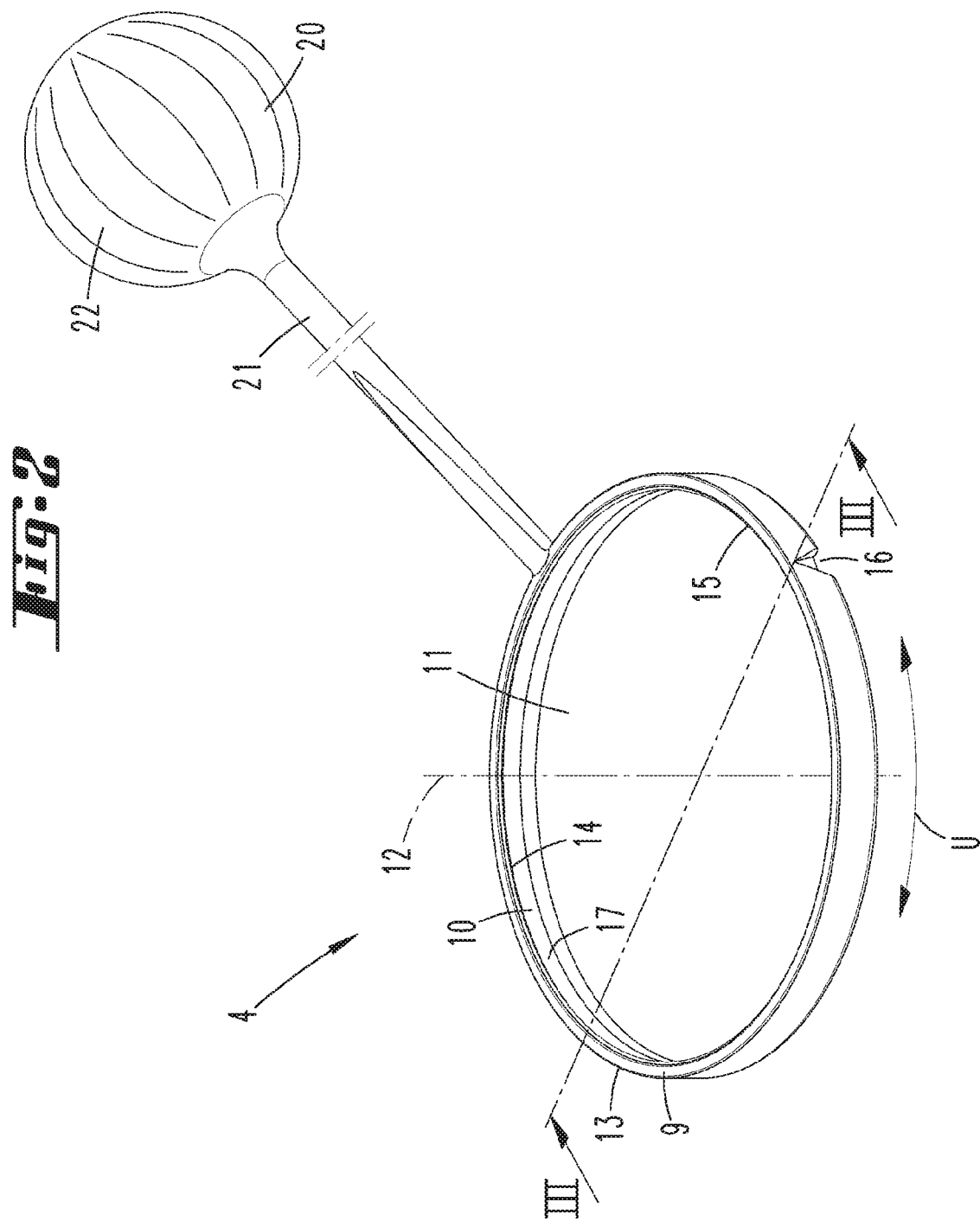

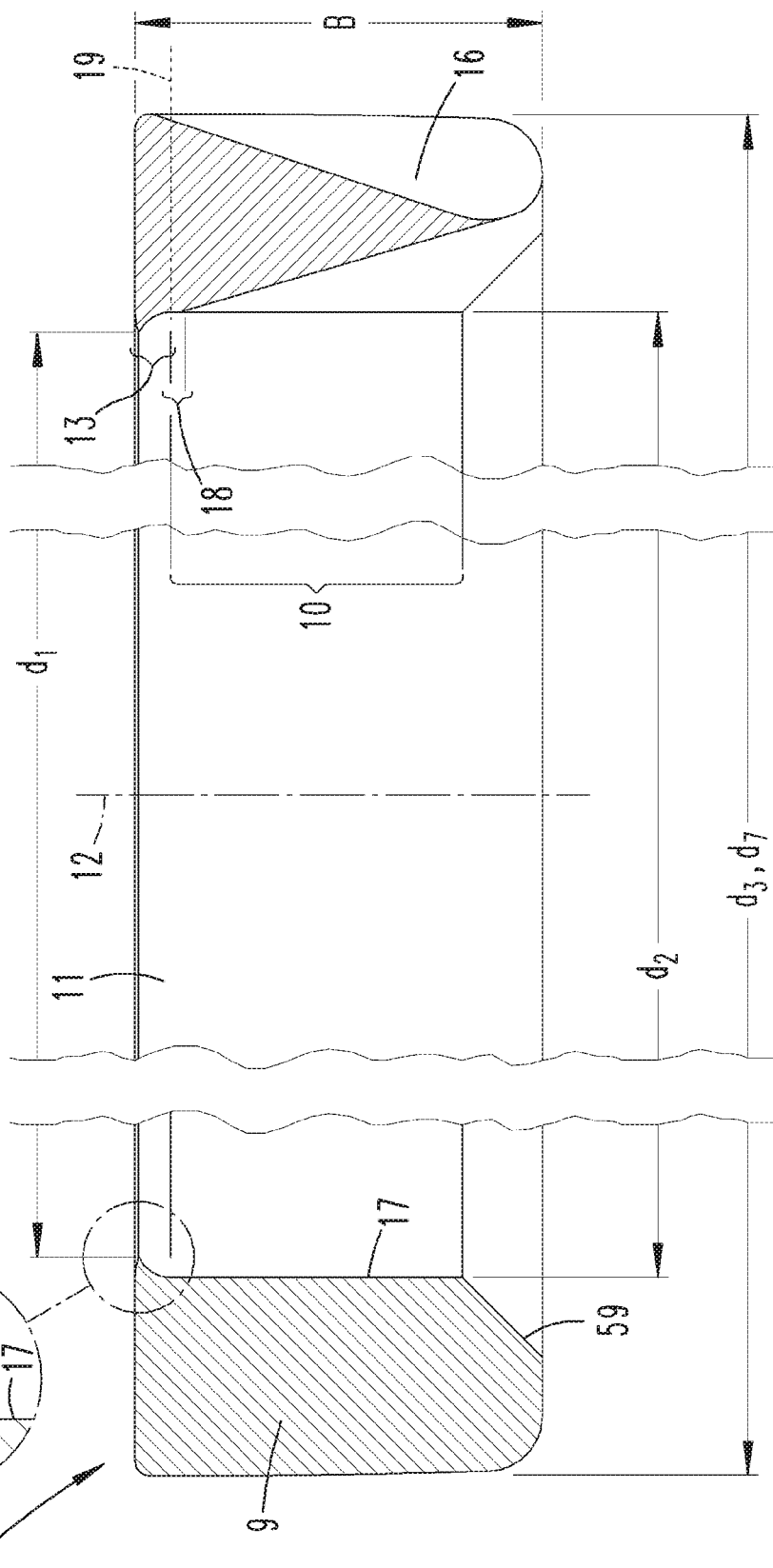

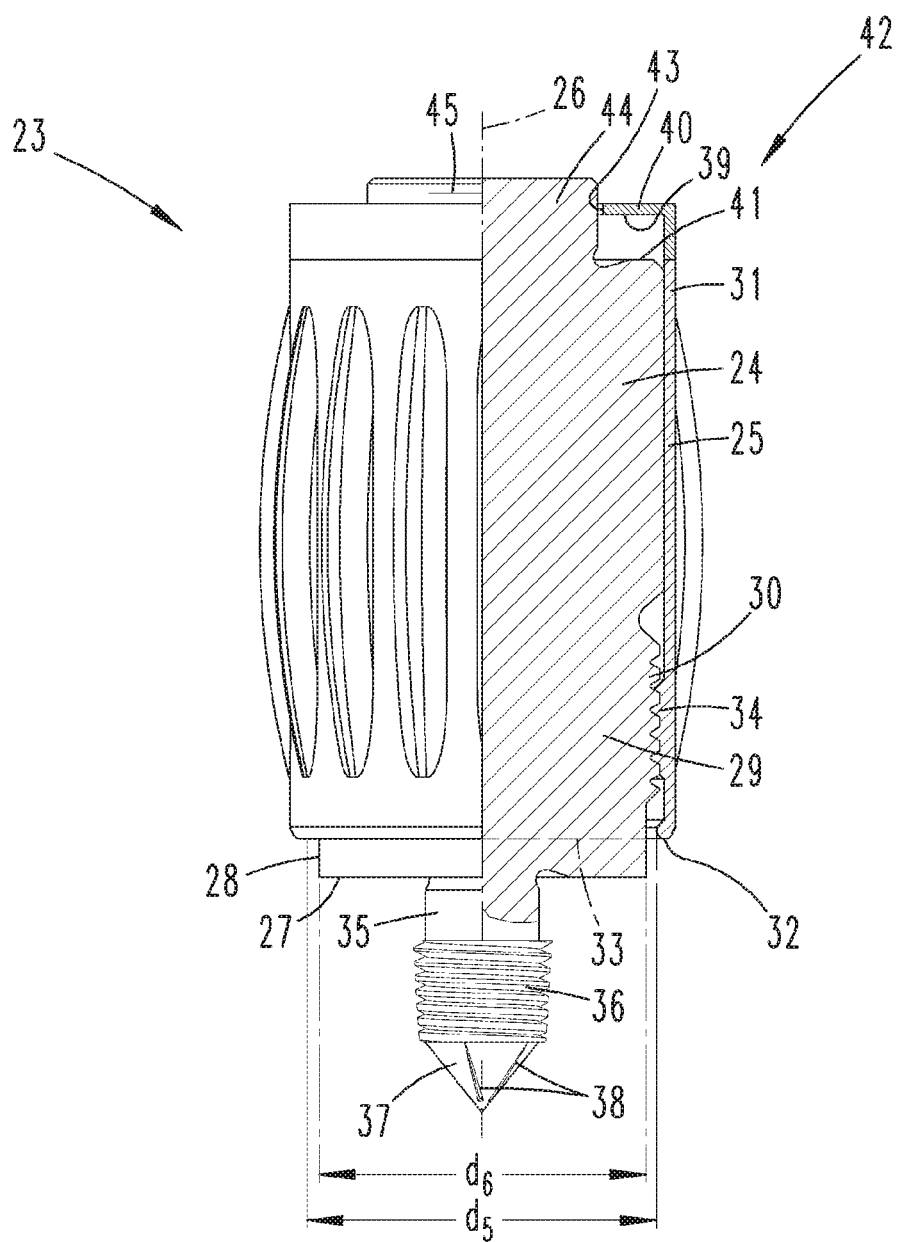

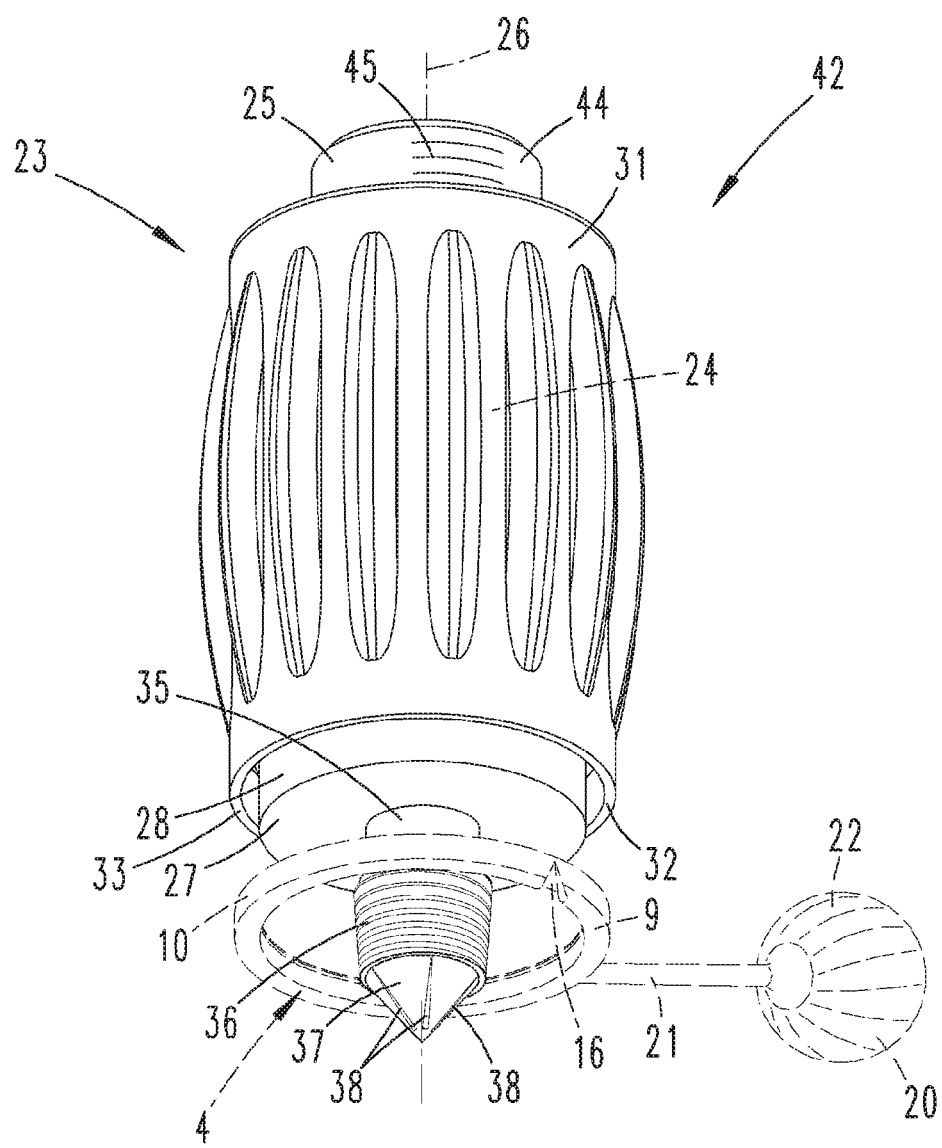

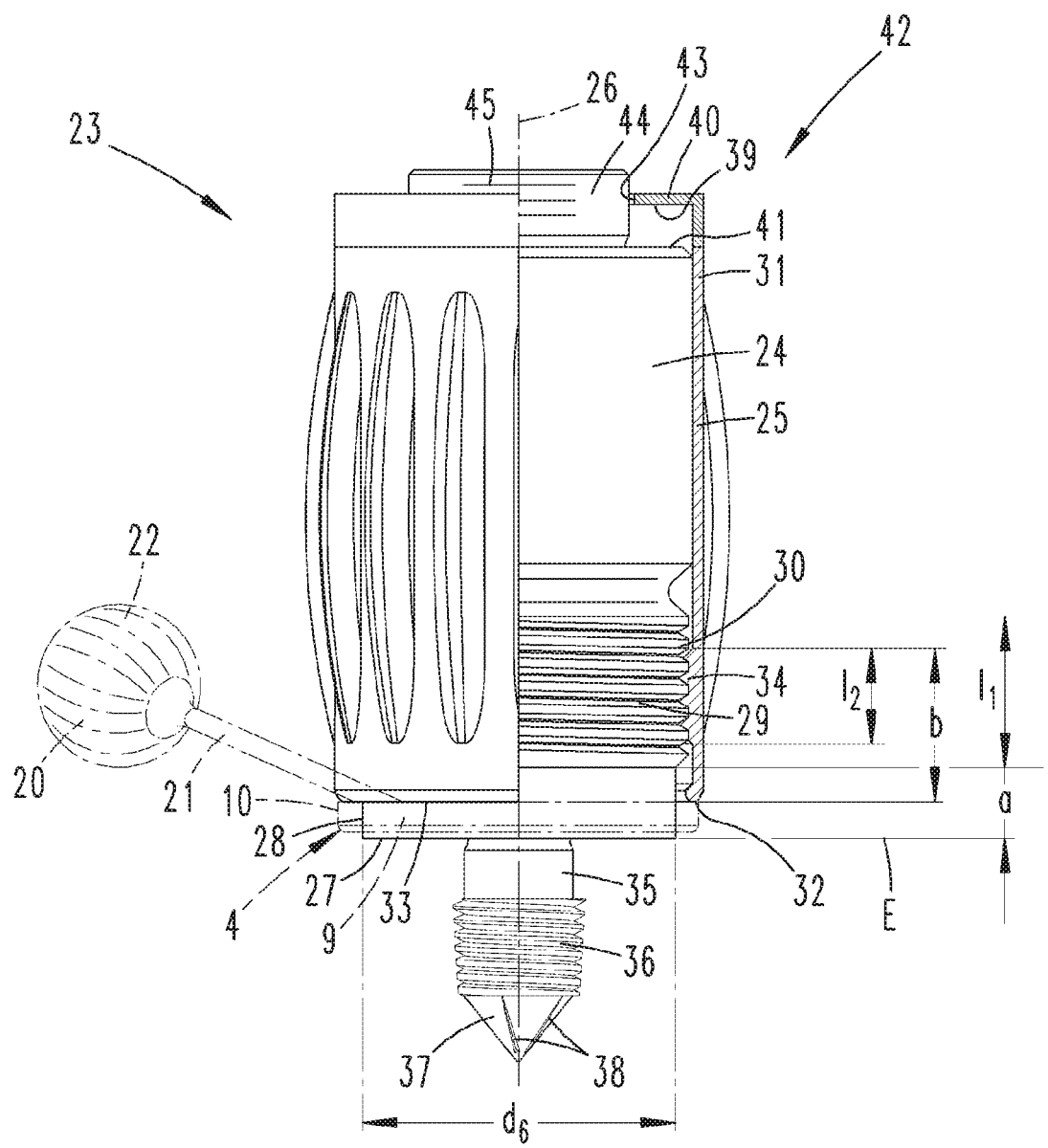

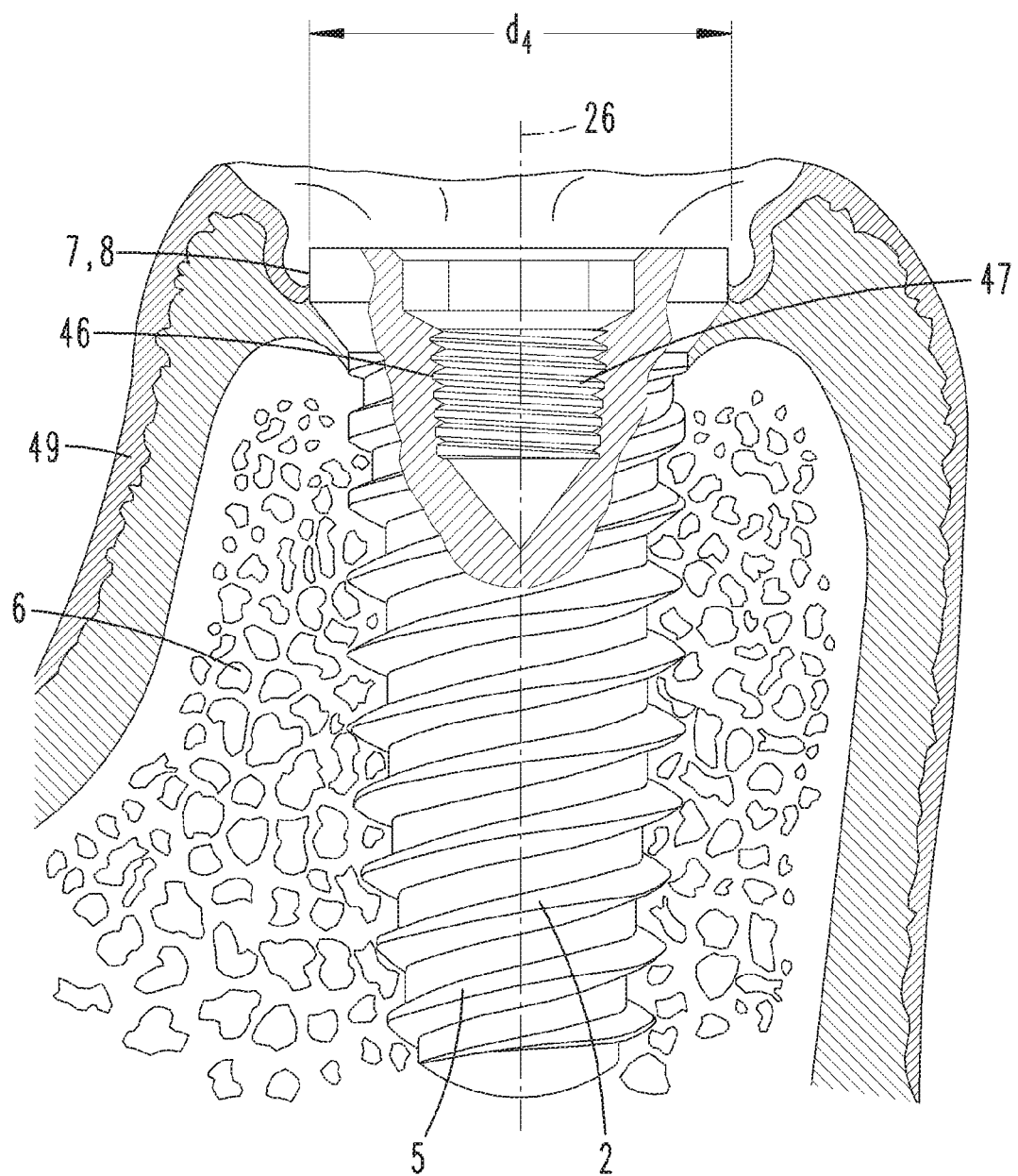

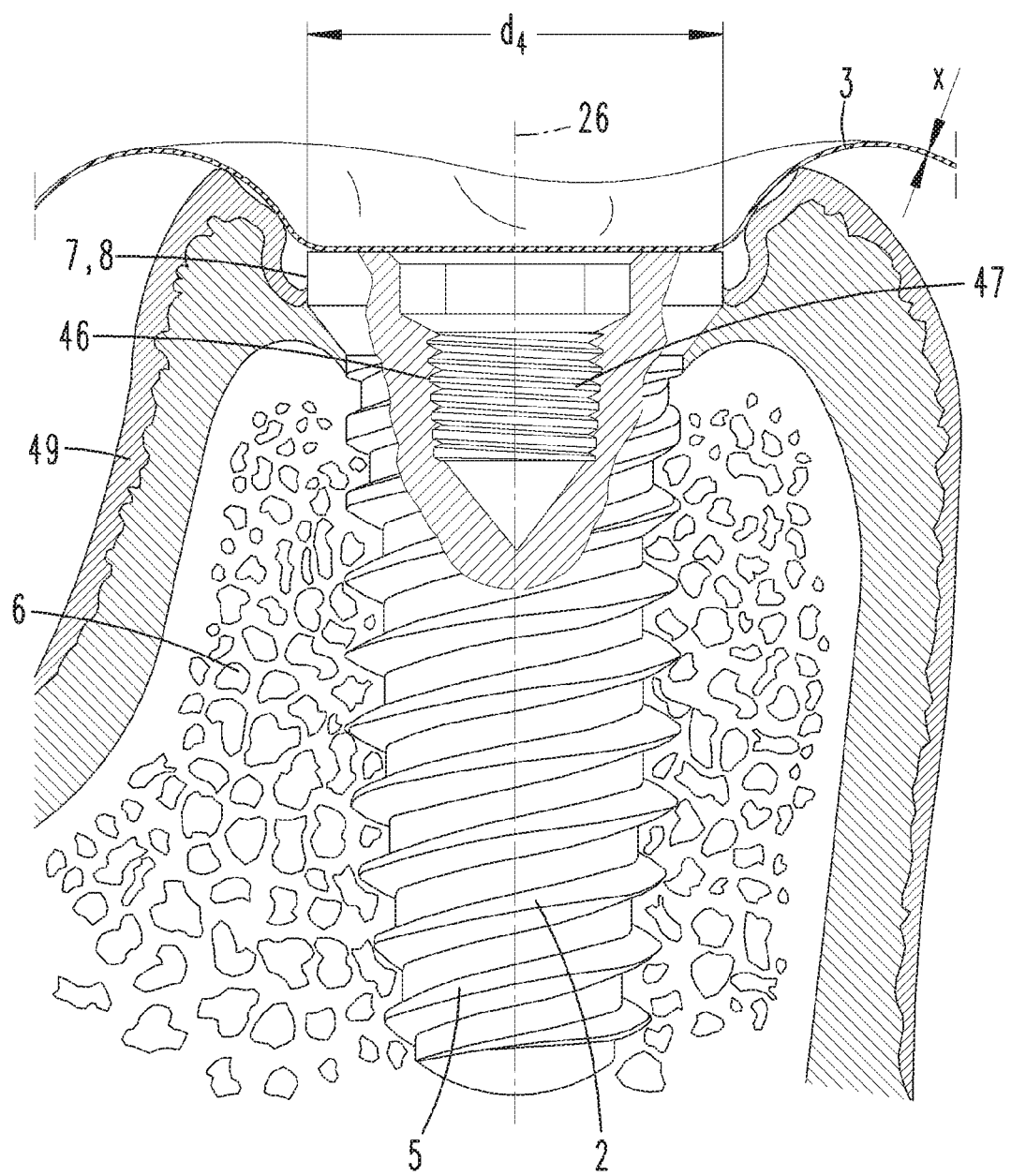

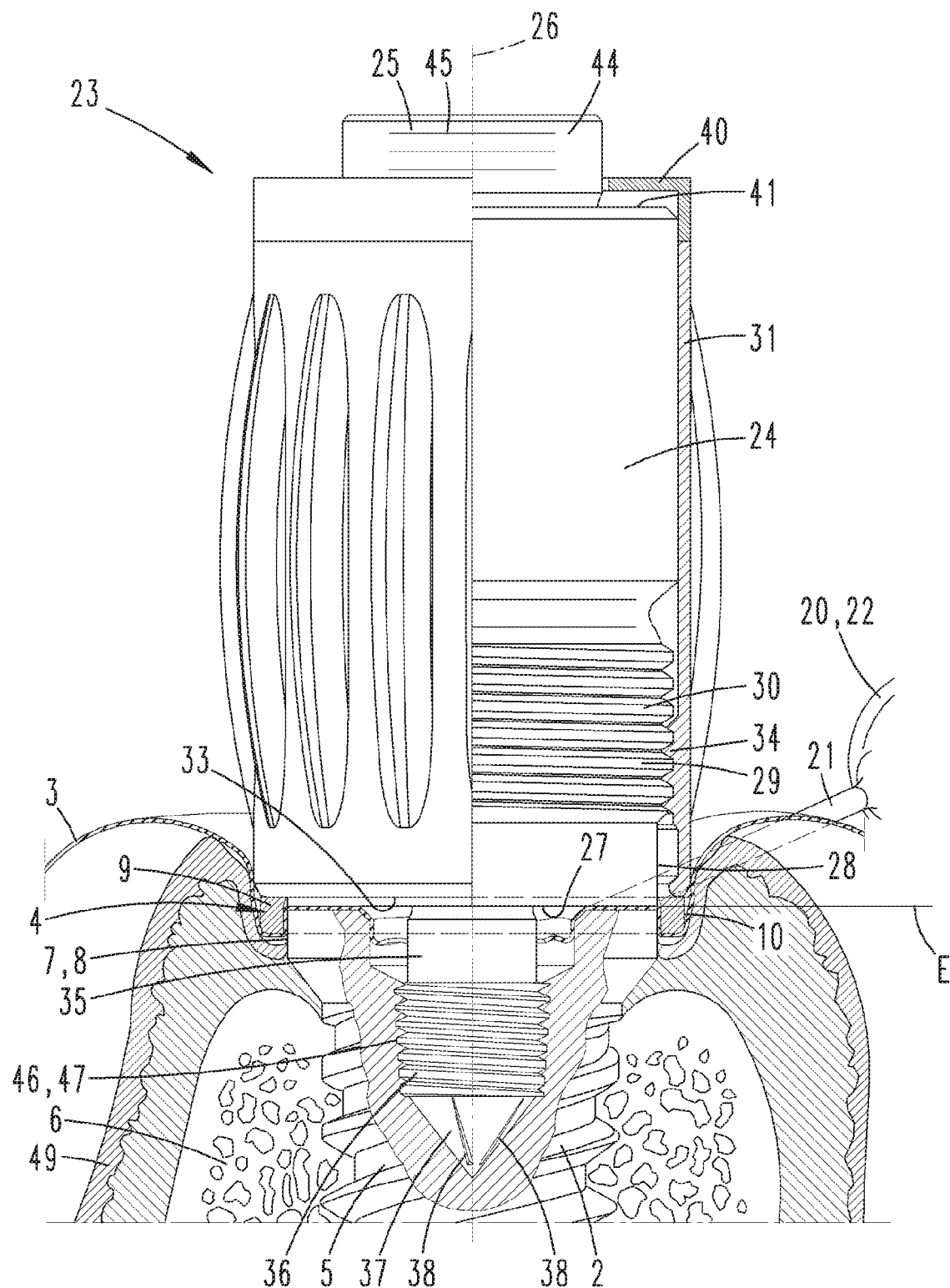

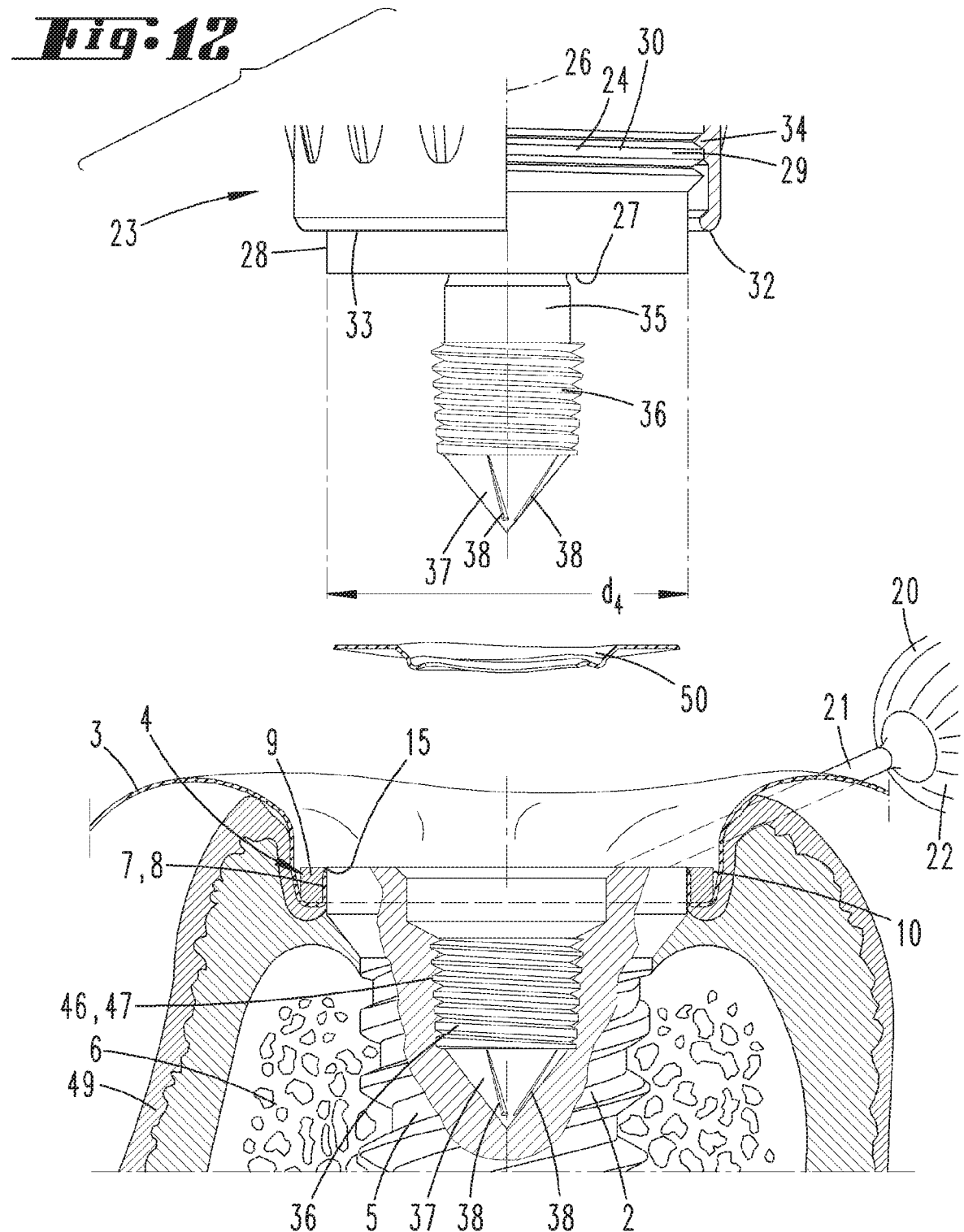

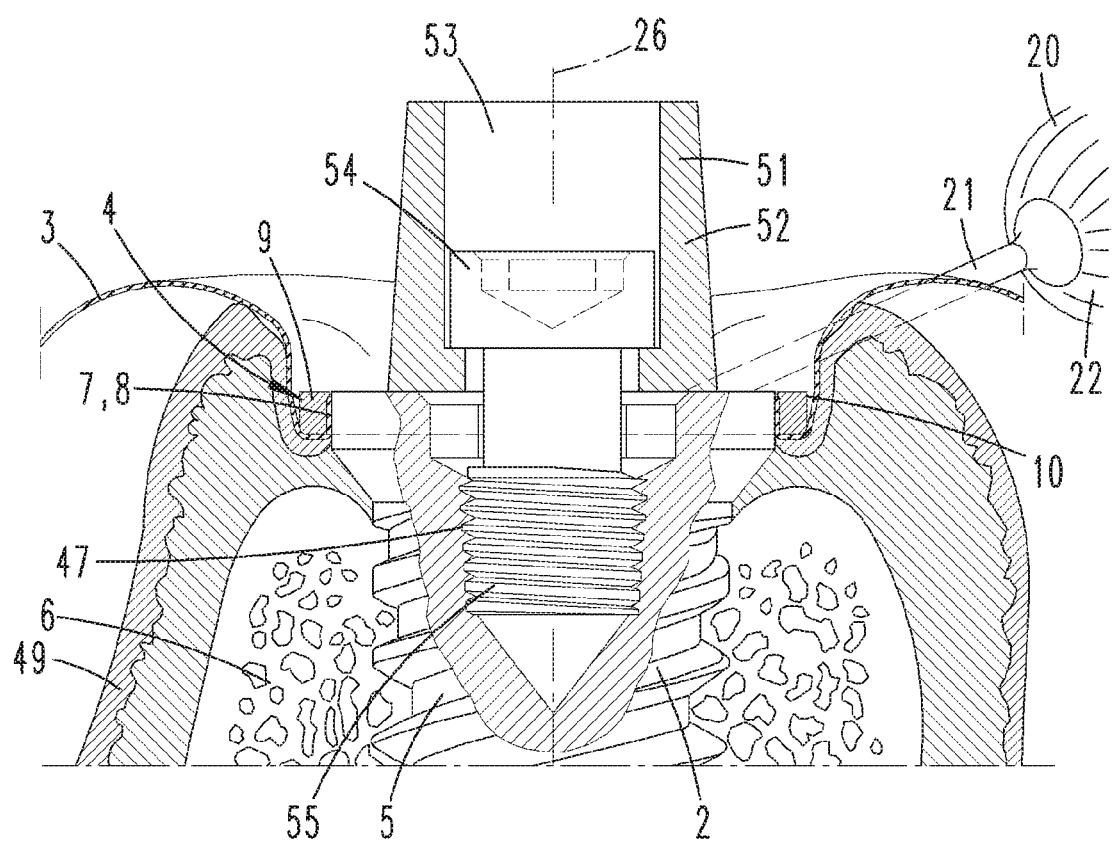

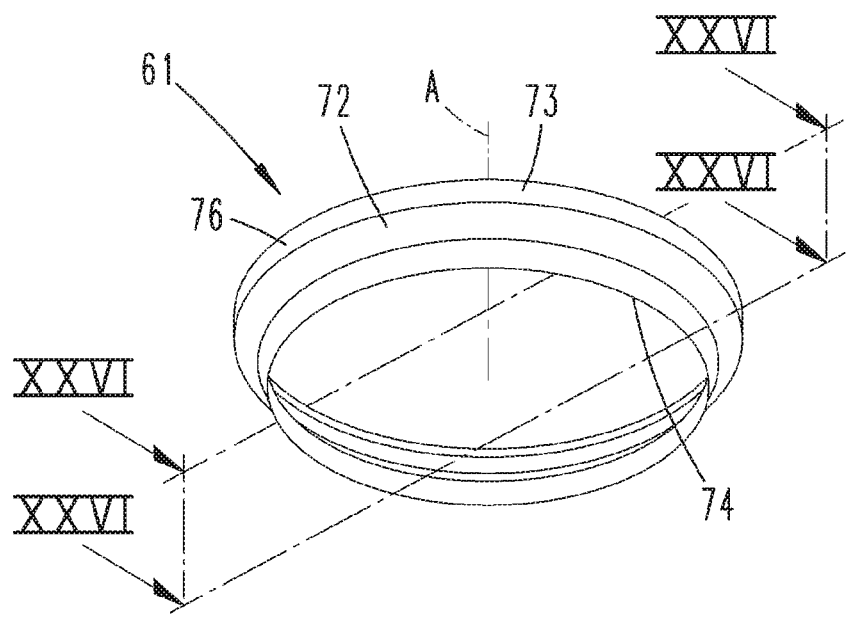

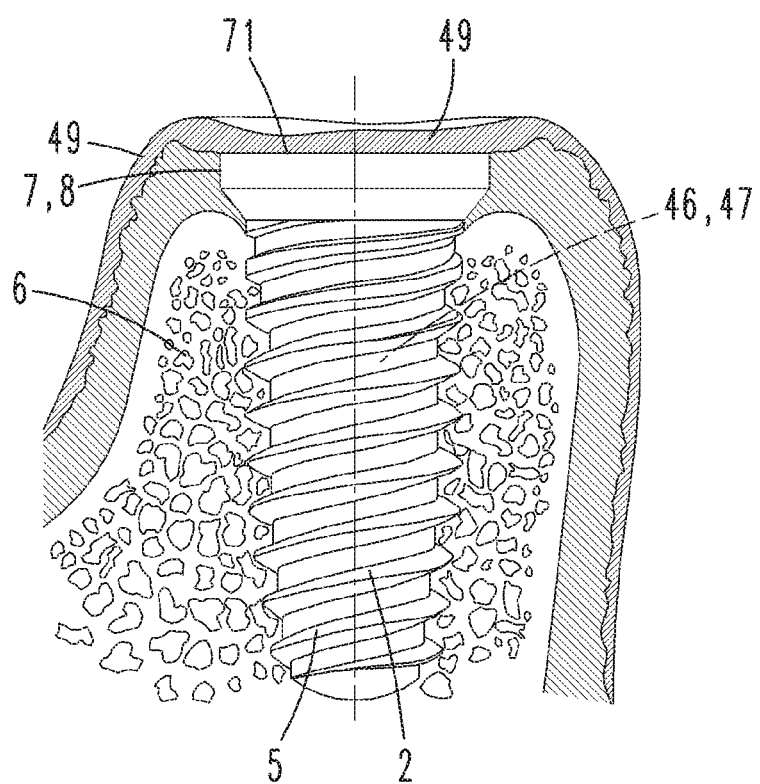

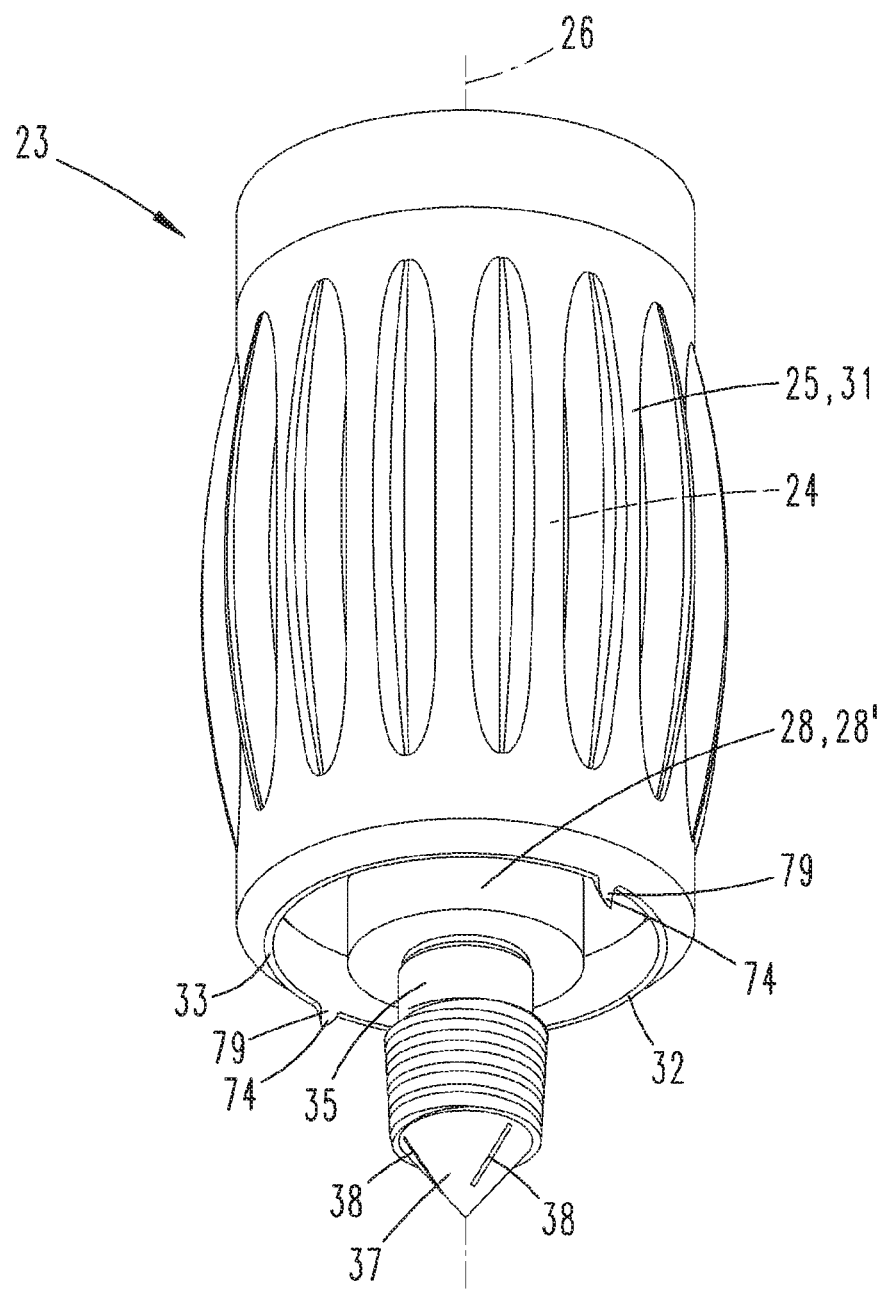

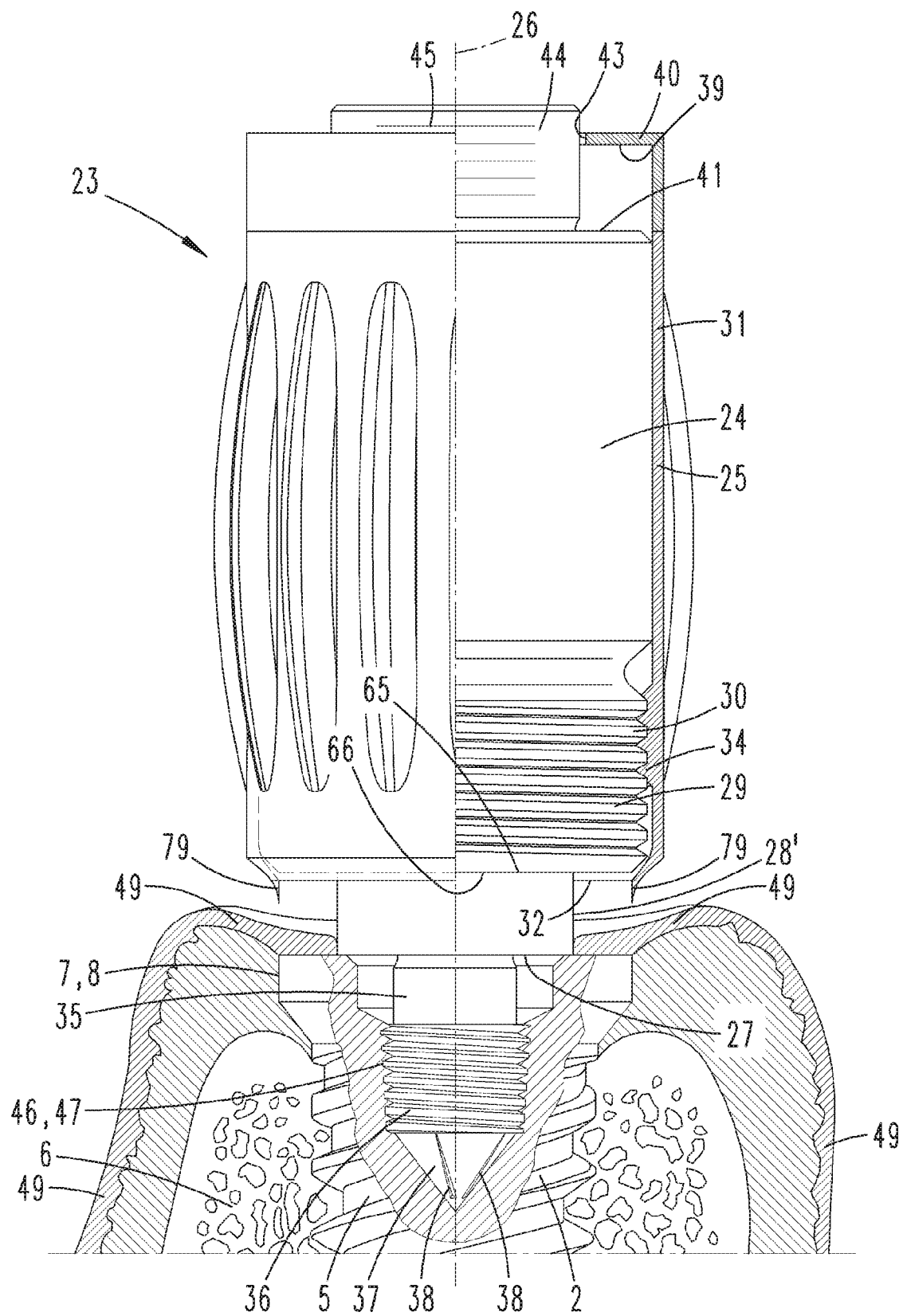

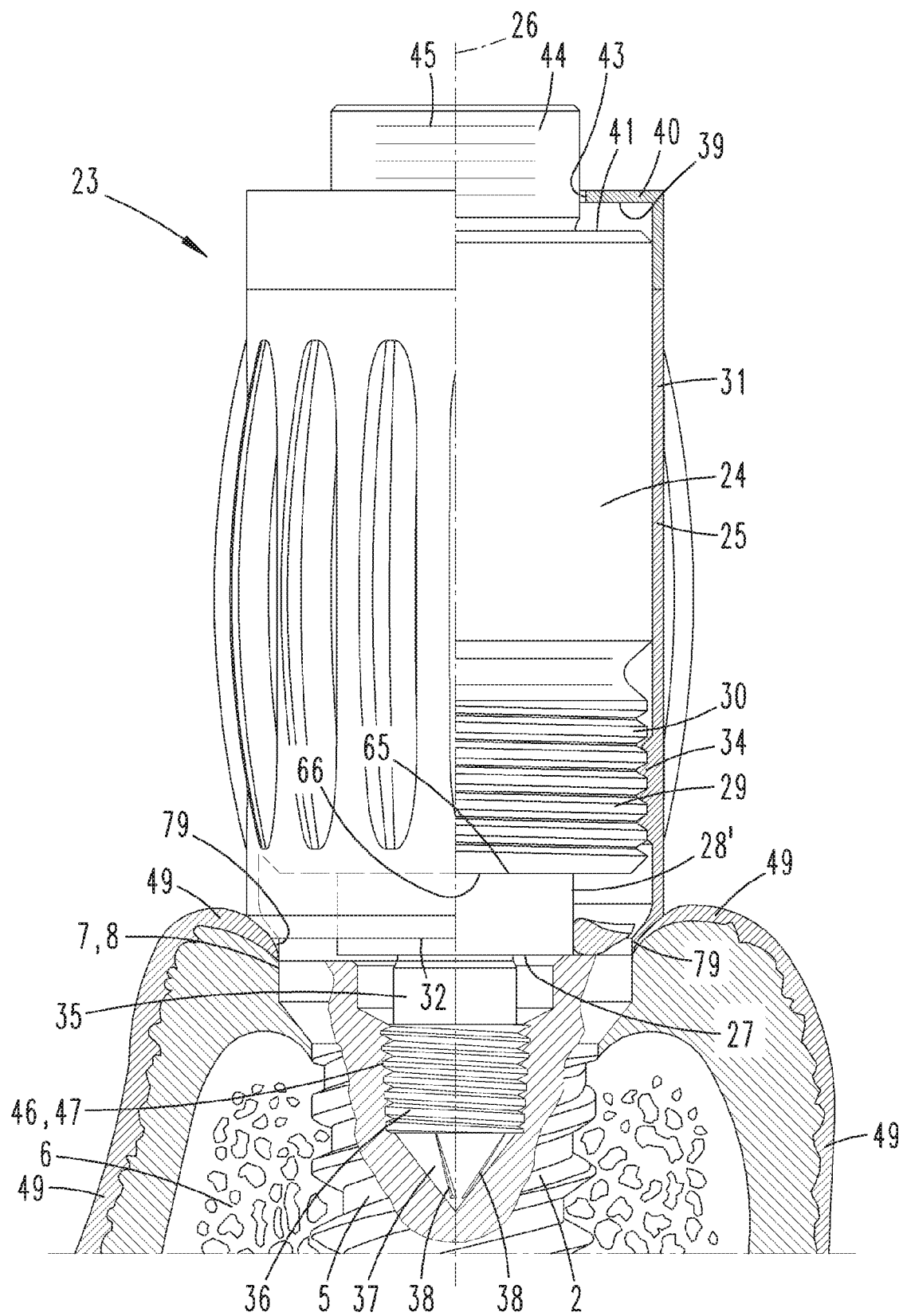

COMBINATION, SYSTEM; HOLDING MEANS; DENTAL TOOL AND DENTAL SET

CROSS REFERENCE TO RELATED APPLICATIONS

This application is the National Stage of PCT/EP2016/081587 filed on Dec. 16, 2016, which claims priority under 35 U.S.C. § 119 of German Application No. 10 2015 122 199.3 filed on Dec. 18, 2015, the disclosures of which are incorporated by reference. The international application under PCT article 21(2) was not published in English.

TECHNICAL FIELD

According to a first aspect, the present invention relates to a combination comprising an implant, a dental dam and a holding means for detachably holding the dental dam at an implant end portion of the implants. The implant is preferably a dental implant, so it is possible to talk of a dental combination in this connection as well.

STATE OF THE ART

A dental implant conventionally serves as a replacement for a lost tooth root and for this purpose it can be inserted in a drillhole created in a jawbone and fastened therein. Implants are known which have an elongated portion with an outer thread for this purpose, which may be screwed into the jawbone. A superstructure may then be attached to an exposed, proximal longitudinal end of the implant, on which chewing forces act during use. The task of the implant is to absorb the chewing forces and transfer them to the jawbone. One possibility for fastening a superstructure is that an implant is used with an inner thread that is open towards its proximal front face, that a support structure (also called an abutment), which may be a sleeve with an end-to-end threaded channel is placed on the proximally exposed (facing away from the jawbone) front face of the implant and is screwed onto the implant with a screw, and a crown is then affixed to the support structure and the implant end with dental cement. In such a case, a difficulty may arise in that cement escapes from the contact joint. In order to prevent the gingiva and the bone surrounding the implant from being contaminated with cement as far as possible, it may be attempted to protect the area around the lateral outer end of the implant with a dental dam. For this, the dental dam must be retained detachably in the required position. However, with the cofferdam clamps known conventionally as holding, means, this presents difficulties.

SUMMARY OF THE INVENTION

Against this background, the task underlying the invention is to advantageously refine a combination of the type described in the introduction. In particular, the objective is that the handling may be made simpler thereby. A further objective is also in particular that a better protection of the area surrounding the implant from contamination, particularly contamination by dental cement may be enabled thereby than with conventional combinations of this kind.

To solve this, the invention suggests a refinement of the combination described in the introduction initially and essentially with the features according to which the holding means comprises a preferably circular ring which is closed at its periphery and which has a clamping portion that borders a ring through-opening. Thus, unlike usual dam clamps which are open at the periphery, a holding means is suggested that is closed at the periphery. This opens up new possibilities for handling and enables a particularly compact and reliable, detachable mounting of the dental dam on a free, proximal longitudinal end of the implant. The proximal longitudinal end of an implant which serves as an artificial tooth root is understood to be that longitudinal end of the implant to which a dental superstructure can be affixed. On the other hand, the distal longitudinal end of such an implant is that longitudinal end which is located at the deepest point in the jawbone after fitting. Such an implant may also be referred to as a dental implant. To this extent, in the context of a dental implant combination according to the invention may also be referred to as a dental combination.

It may preferably be an implant or dental implant that has an outer thread in an elongated portion originating from its distal longitudinal end. It is possible that this elongated portion with the thread may taper towards the distal end. The term cofferdam or dental dam is familiar to the person skilled in the art and does not need further explanation. A dental dam often has a thickness in a range from 0.13 to 0.39 mm.

There are many options for preferred improvement. On the one hand it is preferred that, relating to a relaxed state in each case of the ring clamping portion, the implant end section and the dental dam, particularly in an axial projection view, an inner periphery of the ring clamping portion is larger than an outer periphery of the implant end section and the same size as or smaller than an outer periphery which results on the outer side of the dental dam, when the dental dam in the relaxed state surrounds the outer surface of the implant, lying tightly against it in a single layer. The last described resulting periphery may correspond to the periphery of a notional geometric enveloping surface which encloses the implant end portion continuously in the peripheral direction thereof and at a distance therefrom which corresponds to the thickness of the dental dam in its relaxed state. In all cases, a relaxed state is understood to describe state which is free from external forces, and to this extent not deformed. The inner periphery of the ring clamping portion may be the inner periphery length measured along a peripheral direction leading around the ring centre axis in a reference plane perpendicular to a geometric ring centre axis. The outer periphery of the implant end portion may be the outer periphery length measured along a peripheral direction leading around the implant longitudinal centre axis in a reference plane perpendicular to a geometric implant longitudinal centre axis. The periphery of the enveloping surface may be the periphery length measured along a peripheral direction leading around the implant longitudinal centre axis in a reference plane perpendicular to a geometric implant longitudinal centre axis. The preferred refinement described in the preceding text is independent of the specific cross sectional shape and to this extend allows not only circularly bordered cross sections of the implant end portion and/or of the ring. On the contrary, it also allows for example that cross sections of the implant end portion and/or of the ring are bordered with contours that differ from a circular shape and are possibly even unround. Particularly when the inner periphery of the ring clamping portion is smaller than the outer periphery which results on the outside of dental dam that lies tight against the outer side of the implant end portion, an effective clamping connection may be achieved, by means of which the dental dam may be held detachably on the implant end portion. The holder is detachable, since the dental dam can be released from the implant after the holding means has been removed.

It is preferred that the implant end portion has a rotationally symmetrical, particularly a circular cylindrical implant outer surface. In this context in particular it is preferred that, relating to a relaxed state in each case of the ring clamping portion, the implant end section and the dental dam, in an axial projection view the ring clamping portion borders and in particular surrounds the ring through opening in circular manner, wherein the inside diameter of the ring clamping portion is larger than an outside diameter of the rotationally symmetrical implant outer surface of the implant end portion by a diametric difference, and wherein the thickness of the dental dam (in the relaxed state) is greater than or equal to half of this diametric difference. The projection view described extends axially, i.e. in the direction of a geometric (in this sense notional) ring centre axis, so that said inside diameter of the ring clamping portion is correlated with the projected inner border of the ring clamping portion. Since said outside diameter is correlated with the implant outer surface, it might also be possible simply to talk only of a diameter instead of this.

It is considered advantageous that, relating to a relaxed state in each case of the ring clamping portion, the implant end section and the dental dam, the ring clamping portion borders and in particular surrounds the ring through-opening in circular manner in at least one cross sectional plane perpendicular to the geometric ring centre axis, wherein in this cross sectional plane the inside diameter of the ring clamping portion is larger than an outside diameter of the rotationally symmetrical implant outer surface of the implant end portion by a diametric difference, and wherein the thickness of the dental dam (in the relaxed state) is greater than or equal to half of this diametric difference.

In a preferred embodiment, it is provided that the ring has a ring cutting section adjacent to the ring clamping portion, on which is formed a cutting edge located on a geometric circular contour, particularly on the periphery, wherein the diameter of the circular contour is smaller than the inside diameter of the ring clamping portion. This makes it possible for the ring of the holding means to be used during its application simultaneously for separation of the dental dam, particularly along a closed circumference when the ring with the dental dam is pushed far enough onto the implant end portion for this.

It is considered advantageous that the ring has a predetermined break point or multiple predetermined break points, particularly in the ring clamping portion. In this context, it is preferred that the holding means has a handle which is fastened to the ring clamping portion and/or the ring cutting section, in particular that is connected as a single part thereto, wherein the smallest material cross section of the handle is larger than the smallest material cross section at the predetermined break point or at each predetermined break point. This makes it easier to remove the holding means at a desired time while preventing the handle from being undesirably ripped off the ring.

It is considered advantageous that the ring is manufactured from elastically deformable material, for example from plastic, and/or that the dental dam is manufactured from elastically deformable material, for example rubber, in particular latex rubber. The possibility exists that the implant may have a higher modulus of elasticity and/or a greater hardness and/or a greater mechanical strength compared with the ring, and/or that the ring may have a higher modulus of elasticity and/or a greater hardness and/or a greater mechanical strength compared with the dental dam. With regard to the ring, the possibility exists that in cross sections of the ring perpendicular to the peripheral direction of the ring the ring thickness as half of the difference between the outside diameter of the ring clamping portion and the diameter of the circular contour is larger or smaller than or the same size as the ring width perpendicular thereto.

The invention also relates to a system comprising a combination including an implant which preferably consists of a dental implant, a dental dam and a holding means.

Against the background of the state of the art described in the introduction, the invention suggests first and essentially as an advantageous refinement, particularly in order to solve the object as stated in the introduction, that it is a combination according to the invention, that the dental dam surrounds the implant end portion outwardly along the periphery thereof, and that the ring surrounds the dental dam that encloses the implant end portion outwardly along the periphery thereof, and presses the dental dam enclosing the implant end portion against the implant end portion. To this extent, the system relates to an assembled state of the components that belong to the combination according to the invention. In this context as well, the implant is preferably a dental implant, and to this extent the combination is a dental combination.

According to a further aspect, the invention relates to a holding means, preferably for detachably holding a dental dam on an implant. To this extent also, the implant is preferably a dental implant in the sense explained previously. In this context, it would therefore be possible to talk about a dental holding means.

Against the background of the state of the art described in the introduction, the invention suggests as an advantageous refinement of a holding means that the holding means comprises a particularly circular ring, the periphery of which is closed, and a ring clamping portion which borders a ring through-opening and a ring cutting section adjacent to the ring clamping portion, and that a cutting edge which is in particular closed at the periphery and is particularly located on a geometric circle contour is formed on the ring cutting section, wherein a periphery of the cutting edge is smaller than an inner periphery of the ring clamping portion and wherein in particular the diameter of the circle contour is smaller than an inside diameter of the ring clamping portion. Reference is made to the rest of the description regarding possible effects and advantages.

There are many options for preferred improvement. It is preferred that the diameter of the circle contour is smaller than the inside diameter of the ring clamping portion if the ring clamping portion has a consistent inside diameter, or is smaller than the smallest inside diameter of the ring clamping portion if the ring clamping portion has several different inside diameters. The possibility exists that the ring has a predetermined break point or several predetermined break points in particular in the ring clamping portion. In order to simplify handling, it is preferred that holding means has a handle which is fastened, particularly connected as a single piece to the ring clamping portion and/or the ring cutting section, wherein the smallest material cross section of the handle is larger than the smallest material cross section at the predetermined break point or at any of the predetermined break points, and instead of a material cross section one might also talk of or a cross section or a component cross section, for example. It is considered advantageous that the ring is manufactured from elastically deformable material, from plastic for example.

According to a further aspect, the invention also relates to a dental tool, preferably for detachably fastening a dental dam to an implant by means of a holding means. In this context as well, the implant is preferably a dental implant.

In this context as well, reference is made to the related art described in the introduction. The object underlying this further aspect of the invention is to provide an advantageous dental tool. In particular, the objective is to provide a dental tool which enables an advantageous handling of a holding means according to the invention and a dental combination according to the invention. In order to solve this object, the invention firstly and essentially suggests that the tool comprises a tool inner part and a tool outer part, that the tool inner part has:
- a front face,
- an attachment section, the exterior of which is rotationally symmetrical, particularly circular cylindrical, for attaching a holding means, wherein the attachment section in particular adjoins the front face,
- and a first outer thread;

and that the tool outer part has:
- a sleeve that has a distal sleeve longitudinal end, which in particular forms a distal sleeve front face, and
- a sleeve inner thread conformed on the inside of the sleeve which fits the first outer thread. It is preferred that the axial distance between the front face of the tool inner part and the distal longitudinal end of the first outer thread, the length of the outer thread, an axial distance between the distal sleeve longitudinal end and the proximal longitudinal end of the sleeve inner thread and the length of the sleeve inner thread are coordinated with each other in such manner that the tool outer part is movable, starting from a given first position proximally relative to the tool inner part as a result of the engagement of the thread between the first outer thread and the sleeve inner thread so far in the distal direction by rotation of the tool outer part relative to the tool inner part that a movement of the distal sleeve longitudinal end results at least along an elongated portion of the attachment section, in particular as far as the front face of the tool inner part and in particular beyond the front face of the tool inner part. An axial distance is understood be a distance in a direction parallel to a geometric tool longitudinal centre axis. Regarding the dental tool, the proximal direction or the side is understood to be the side or direction facing toward the user, for example a dentist, during use (i.e. facing away from the implant), while the term distal direction or side denotes the opposite direction and side. The tool suggested by the invention enables a reliable, simple application of a holding means according to the invention on an implant end portion of an implant which is covered by a dental dam which is preferably a dental implant.

According to still another aspect, the invention relates to a dental tool. For the purposes of an advantageous configuration, the invention suggests that the tool comprises a tool inner part and a tool outer part, that the tool inner part has:
- a front face,
- a tool inner part elongated section, the exterior of which is in particular rotationally symmetrical, particularly circular cylindrical, wherein the tool inner part elongated section in particular adjoins the front face,
- and a first outer thread;

and that the tool outer part has:
- a sleeve that has a distal sleeve longitudinal end, which in particular forms a distal sleeve front face, and
- a sleeve inner thread conformed on the inside of the sleeve which fits the first outer thread.

It is preferred (i.e. not essential) that the axial distance between the front face of the tool inner part and the distal longitudinal end of the first outer thread, the length of the outer thread, an axial distance between the distal sleeve longitudinal end and the proximal longitudinal end of the sleeve inner thread, and the length of the sleeve inner thread are coordinated with each other in such manner that the tool outer part is movable, starting from a given first position relative to the tool inner part as a result of the engagement of the thread between the first outer thread and the sleeve inner thread so far in the distal direction by rotation of the tool outer part relative to the tool inner part that a movement of the distal sleeve longitudinal end results at least along an elongated portion of the tool inner part elongated section, in particular as far as the front face of the tool inner part and in particular beyond the front face of the tool inner part. The tool inner part elongated portion is a partial section of the tool inner part. The tool inner part elongated portion preferably extends between the first outer thread and said front face of the tool inner part. The tool inner part elongated portion may be of various configurations depending on requirements, wherein one configuration as an attachment section is possible but not essential.

With regard to either of the two previously described aspects of the invention, many options for a preferred further development of a dental tool according to the invention exist for each. Accordingly, it is preferred that the tool inner part has a projection extending centrally in the distal direction beyond the front face, on which a second outer thread is conformed, wherein the second outer thread has a smaller thread diameter than the first outer thread. The second outer thread may serve for screwing the tool onto an implant already placed in the jawbone. It is preferred that the projection comprises a distal tip which particularly has a cutting edge or multiple cutting edges. This makes it possible for the tool to cut through and split the dental dam covering the implant for screwing onto the implant. It is preferred that the tool outer part forms a first end stop, that the tool inner part forms a second end stop, and that when the tool outer part is moved in the distal direction relative to the tool inner part, in a certain axial relative position the first end stop and the second end stop create a form lock which is effective in the axial direction and prevents further movement of the tool outer part relative to the tool inner part.

It is preferred that the sleeve has an inwardly facing surface on the distal sleeve longitudinal end or adjacent to the distal sleeve longitudinal end, which forms an inner contour in a cross sectional plane perpendicular to a tool longitudinal centre axis of the tool, wherein the inner contour has a constant radial distance or a variable radial distance along a periphery leading around the tool longitudinal centre axis, that the attachment section or the tool inner part elongated portion forms an outer contour with an outer surface in a cross sectional plane perpendicular to a tool longitudinal centre axis, wherein the outer contour has a constant radial distance or a variable radial distance along a periphery leading around the tool longitudinal centre axis, and that the ratio of the constant radial distance of the inner contour to the constant radial distance of the outer contour or the ratio of the smallest radial distance of the inner contour to the largest radial distance of the outer contour is greater than the value 1 and in particular lies in a value range from 1.1 to 2.

The possibility exists that the tool inner part has a surface which extends circularly, in particular perpendicularly to the tool longitudinal centre axis adjoining or adjacent to an axial longitudinal end of the attachment section or of the tool inner part elongated portion farthest from the front face. This surface may serve for example as a bearing surface for a plug-in adapter. In this context, it is preferred that the dental tool comprises an annular plug-in adapter consisting of one or multiple parts for plugging into the attachment section, wherein the plug-in adapter has an annular inner contour which is adapted in terms of shape and/or dimensions to an outer contour of the attachment section to achieve a plug in connection with no clearance in the radial direction or little clearance in the radial direction.

The possibility exists that the tool comprises a cutting attachment, that the cutting attachment has a ring-shaped base body which is detachably attached or detachably attachable to the sleeve, in particular to the distal sleeve longitudinal end thereof, and that the cutting attachment has one or more cutting edges. It is considered a useful further development that the base body comprises a centring section, wherein the centring section either has an outside diameter which is adapted to an inside diameter of the sleeve to achieve a centring, in particular with clamping effect, or it has an inside diameter which is adapted to an outside diameter of the sleeve to achieve a centring, in particular with clamping effect.

It is also considered a preferred further development in which the base body has first means and the sleeve has second means, wherein the first means and the second means are adapted so that when the cutting edge attachment is attached to the sleeve a rotary die closure of the cutting edge attachment relative to the sleeve is created with reference to a peripheral direction leading around a tool longitudinal centre axis. A variation considered useful is one in which either the second means comprise at least one recess on the sleeve and the first means comprise at least one projection which protrudes from the cutting attachment, or the second means comprise at least one projection protruding from the sleeve and the first means comprise at least one recess conformed on the cutting attachment, and that in a state in which the cutting edge attachment is attached to the sleeve the projection engages in the recess, forming a mutual structure which prevents a movement relative to each other in the peripheral direction.

With regard to the cutting edge, the possibility exists for example that the cutting edge is formed along a circle contour, in particular along the entire periphery of the circle contour. Alternatively or in addition thereto, the possibility exists that the cutting attachment has a scalpel projection or several scalpel projections, wherein the cutting edge is formed on the scalpel projection or wherein a respective cutting edge is formed on each scalpel projection.

As an alternative to a cutting edge attachment which is detachable from the rest of the tool, the possibility exists that a scalpel projection or several scalpel projections is or are conformed on the distal sleeve longitudinal end, in particular integrally therewith, wherein a cutting edge is conformed on the scalpel projection or wherein a respective cutting edge is conformed on each scalpel projection. It is preferred that the axial distance between the front face of the tool inner part and the distal longitudinal end of the first outer thread, the length of the outer thread, an axial distance between the distal sleeve longitudinal end and the proximal longitudinal end of the sleeve inner thread as well as the length of the sleeve inner thread are coordinated with each other in such manner that the tool outer part is movable, starting from a given position relative to the tool inner part as a result of the engagement of the thread between the first outer thread and the sleeve inner thread so far in the distal direction by rotation of the tool outer part relative to the tool inner part that a movement of the cutting edge or cutting edges results at least along an elongated part portion of the attachment section or along an elongated portion of the tool inner part elongated portion, in particular as far as the front face of the tool inner part and in particular beyond the front face of the tool inner part. If the cutting edge or the cutting edges are arranged on a cutting edge attachment which is detachable from the rest of the tool, this refers to a state in which the cutting attachment is attached to the rest of the tool.

According to a further aspect, the invention relates to a dental comprising a dental tool and a holding means.

Against the background of the related art as described previously, the invention suggests that in order to provide an advantageous dental set the dental tool include individual or multiple features of those described in the preceding text, that the holding means include individual or multiple features of those described in the preceding text, and that an inside diameter of the ring, particularly a diameter of the geometric circle contour of the cutting edge of the ring cutting section or an inside diameter of the ring clamping portion, and an outside diameter of the attachment section are coordinated with each other so that between them a guide is created with little clearance or no clearance, particularly to achieve a transition tolerance or a clamp and plug connection. An inside diameter of the distal sleeve longitudinal end is larger than or as large as an outside diameter of the attachment portion and smaller than an outside diameter of the ring. For possible effects and advantages, reference is made to the rest of the description.

According to a further aspect, the invention relates to a dental set comprising a dental tool and a combination, wherein the combination includes an implant, a dental dam and a holding means for detachably holding the dental dam on an implant portion of the implant.

Against the background of the state of the art described previously, the invention suggests that in order to provide an advantageous dental set, first and essentially the dental tool is a dental tool which includes individual or multiple features of those described in the preceding text, that the combination is a combination which includes individual or multiple features of those described in the preceding text, that the implant on the implant end portion has a recess which is open on its proximal end with an inner thread conformed therein, and that this inner thread fits the second outer thread of the tool inner part conformed on the projection.

According to a further aspect, the invention relates to a dental set comprising a dental tool and an implant, wherein the implant comprises an implant end portion which has an implant outer surface, which is particularly of rotationally symmetrical particularly circular cylindrical design.

For advantageous further development, the invention suggest that the dental tool is a dental tool which includes individual or multiple features of those described in the preceding text. It is preferred that the implant on the implant end portion has a recess which is open on its proximal end with an inner thread conformed therein, and that this inner thread fits the second outer thread of the tool inner part conformed on the projection.

There are many possibilities for preferred further development. The possibility exists that the thread engagement between the first outer thread and the sleeve inner thread has a greater idling torque resistance than a thread engagement between the second outer thread and the inner thread of the implant end portion. The term idling torque resistance refers to the torque which is required only to screw in an out when no other external loads are operating. It is preferred that the frontal outside diameter of the attachment section is equal to the frontal outside diameter of the implant end portion. This makes it easier to slide the ring of the attachment section onto an implant end portion.

If the tool has a plug-in adapter, it is preferred that the plug-in adapter has a cylindrical outer surface, the diameter of which is equal to an outside diameter of the implant outer surface on the implant end portion.

It is further preferred that either the cutting edge or the cutting edges of the cutting edge attachment extends or extend along a geometric circle, or the cutting edge or cutting edges intersect a geometric circumference, wherein each diameter of the circle is the same size as the outside diameter of the implant outer surface of the implant end portion, or is comparatively larger or smaller.

BRIEF DESCRIPTION OF THE DRAWING

In the following text, the inventions will be described with reference to the accompanying figures which illustrate preferred embodiments. The individual figures show:

FIG. 1 a perspective, partially cutaway view of a preferred embodiment of a combination according to the invention which comprises a holding means according to the invention, and a preferred embodiment of a dental tool according to the invention and a dental set according to the invention, each according to a preferred embodiment;

FIG. 1a a perspective view of a combination, comprising the implant, dental dam and holding means shown in FIG. 1;

FIG. 2 an enlarged perspective view of the holding means according to the invention shown in FIG. 1;

FIG. 3 a cross sectional view along section plane III-III;

FIG. 4 an enlarged view of the dental tool shown in FIG. 1, in a side view on one side and a cross sectional view on the other;

FIG. 5 a perspective view of the dental tool shown in FIG. 4, with the addition in dashed lines of an embodiment of a holding means according to the invention for a dental set;

FIG. 6 the components shown in FIG. 5, but in a partially cutaway side view;

FIG. 7 an enlarged sectional view of the implant shown partially in FIG. 1 implanted in a jawbone;

FIG. 8 an example of a preferred operating state of the combination according to the invention, in which, starting from the situation shown in FIG. 7 the implant and the area adjacent to the implant has been covered by means of the dental dam;

FIG. 10 an example of a preferred operating state, in which, starting from the situation shown in FIG. 9, the ring of the holding means has been partially stripped off the dental tool and pushed onto the implant around the dental dam;

FIG. 12 an example of a further preferred operating state, in which, starting from the situation shown in FIG. 11, the dental tool and a portion of the dental dam cut out of the dental dam have been removed from the implant;

FIG. 13 an example of a further preferred operating state, in which, starting from the situation shown in FIG. 12, a sleeve-type superstructure has been placed on the implant and screwed onto the implant;

FIG. 25 a perspective view of the in FIGS. 23, 24 with represented cutting attachment, FIG. 26 a sectional view along a section plane XXVI-XXVI as shown in FIG. 25;

FIG. 27 a partially cutaway view of a jar region in which an implant without a healing cap is inserted;

FIG. 32 a perspective view of a dental tool according to the invention according to a further preferred embodiment with scalpels conformed integrally on the tool outer part the example;

FIG. 33 half in side view and half in cross sectional view in each case, the dental tool shown in FIG. 32 in an exemplary preferred operating state and FIG. 34 a preferred operating state that follows the operating state shown in FIG. 33.

DESCRIPTION OF THE EMBODIMENTS

Figure 9:
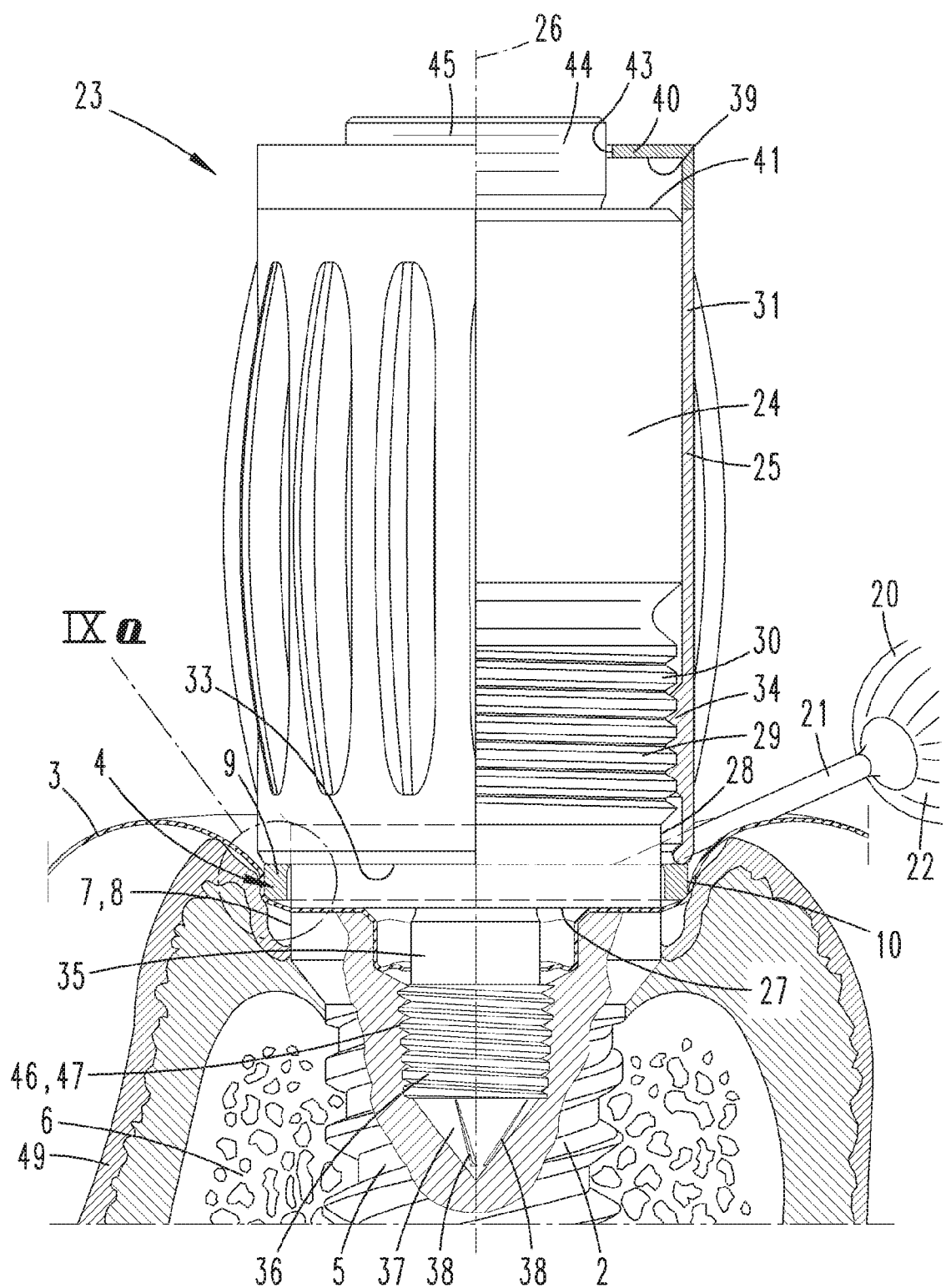
FIG. 9 an example of a preferred operating state, in which, starting from the situation shown in FIG. 8, the dental tool shown in the preceding figures with the holding means according to the invention shown in the preceding figures attached has been screwed into the implant.
Figure 9A:
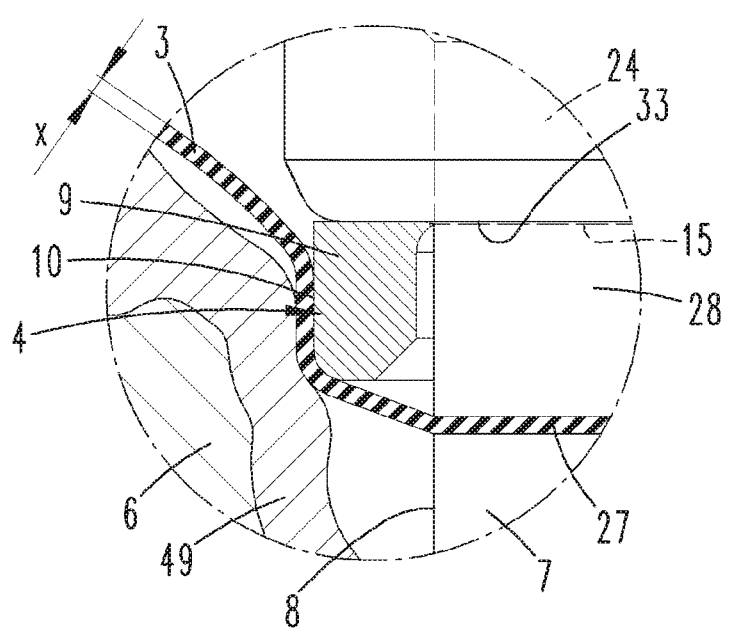
FIG. 9a an enlarged inset of detail IXa of to FIG. 9.

With reference to FIGS. 1-3, first a preferred embodiment of a combination 1 according to the invention will be described. This comprises an implant 2, a dental dam 3 and a holding means 4. FIG. 1 additionally shows an embodiment of a dental tool 23 according to the invention, which will be explained later with reference to other figures. The implant 2, which is a dental implant, comprises a threaded portion 5 bearing an outer thread, which portion has been screwed into a jawbone 6 in the application example shown in FIG. 1, and an implant end portion 7 axially adjacent thereto, of which the outwardly facing implant outer surface 8 has a circular cylindrical shape. The holding means 4 serves for detachably holding and/or temporary fixing of dental dam 3 on implant end portion 7, in particular in order to cover the surrounding area laterally adjacent to the outside of the implant end portion 7 during subsequent fitting of a superstructure and a crown. This is intended to prevent certain quantities of the cement used in the process from accidentally coming into contact with the bone or the gingiva when the crown is being fitted.

Holding means 4 comprises a circular ring 9 which is closed at its periphery. Reference number 11 designates a ring through opening enclosed by ring 9, and 12 designates a geometric ring centre axis. Ring 9 comprises a ring clamping portion 10 and a ring cutting section 13 axially adjoining the one longitudinal end thereof, i.e. in a direction parallel to ring centre axis 12. A ring section with an internal chamfer 59 which thus tapers towards its free longitudinal end adjoins the other longitudinal end. A radially inwardly facing, peripherally closed cutting edge 15 is conformed on ring cutting section 13 and lies on a geometric circle contour 14. Diameter $d_1$ of circle contour 14 is smaller than the inside diameter $d_2$ of the ring clamping portion. In the example, ring clamping portion 10 has a predetermined break point 16. This is in the form of a notch in the region of which a partial section of the ring clamping portion 10 has a thinner wall thickness. Since the predetermined break point 16 is only conformed locally on the periphery, inside diameter $d_2$ can still be assigned to the course of the rest of the circular cylindrical inner surface 17 of the ring clamping portion in the example. In the example, the notch of the predetermined break point 16 does not extend over the entire axial length of ring clamping portion 10. In a region 18 of ring-clamping portion 10 which adjoins ring cutting section 13 axially, i.e. also in the cross sectional plane 19 perpendicular to ring centre axis 12 selected for exemplary purposes in FIG. 3, the ring clamping portion 10 surrounds the ring through opening in an unbroken circle, that is to say continuously along a circle whose diameter corresponds to inside diameter $d_2$. Holding means 4 comprises a handle 20 for handling purposes. This handle includes a handle bar 21 which is connected integrally to the outer side of ring 9 and is shown schematically foreshortened by a double line in FIG. 2, and a handle end 22 adjoining the other longitudinal end thereof. Handle 20 is offset from the peripheral direction U of ring 9 and adjoins ring 9 at a distance from predetermined break point 16. The smallest material cross section of handle 9, i.e. in the example the cross section of handle bar 21, is noticeably larger than the smallest material cross section of ring 9 at predetermined break point 16. In the example, holding means 4 is made of rubber. FIG. 3 illustrates that in the example in cross sections perpendicular to the peripheral direction U of ring 9 ring width B as a dimension of the ring is larger in the direction parallel to ring centre axis 12 than the ring thickness, as which the half of the difference between outside diameter $d_3$ of ring 9 and diameter $d_1$ is considered to be.

Figure 11:
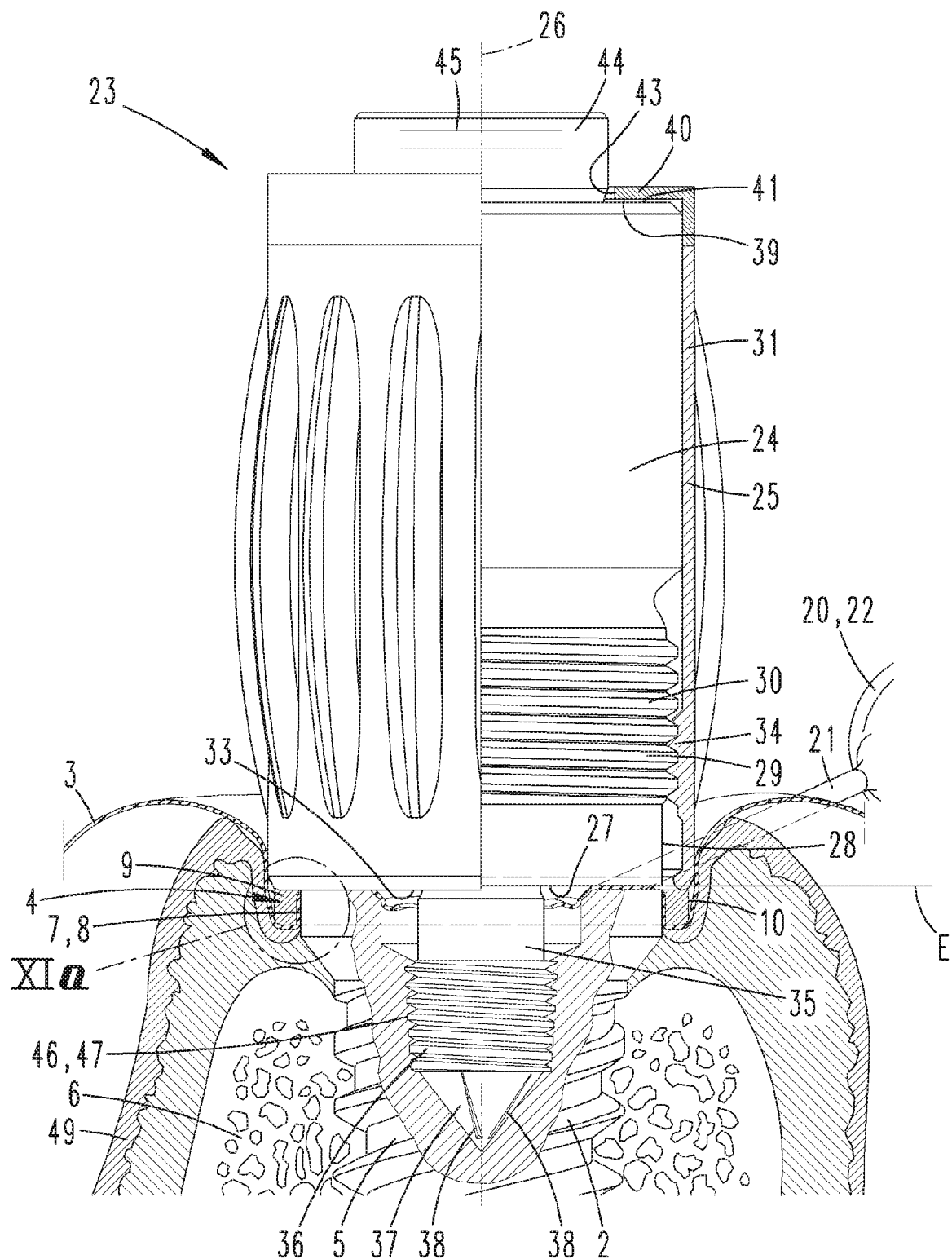
FIG. 11 an example of a preferred operating state, in which, starting from the situation shown in FIG. 10, the ring of the holding means has been pushed onto the implant with the dental dam far enough for the dental dam to be cut by the circular cutting edge of the holding means.
Figure 11A:
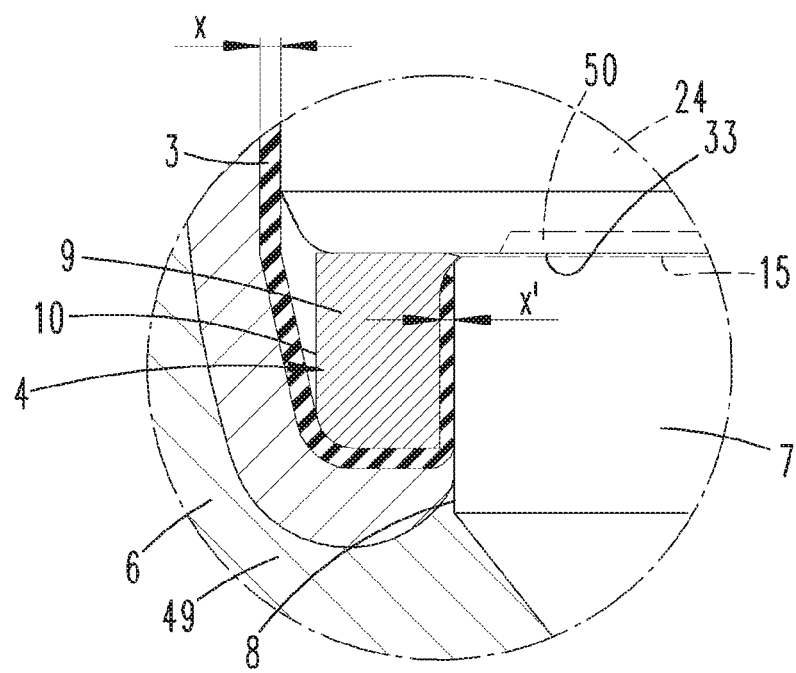
FIG. 11a an enlarged inset of detail XIa of FIG. 11.

In FIG. 1a, the diameter that is assigned to the circular cylindrical implant outer surface 8 of implant end portion 7 is expressed as $d_4$ and in the following text will also be referred to as outside diameter $d_4$. The inside diameter $d_2$ of ring clamping portion 10 and specifically of the section 18 located there is a diametric difference larger than the outside diameter $d_4$, so that it would be possible to place ring clamping portion 10 on implant end portion 7 with a certain lateral clearance. On the other hand, the thickness of the dental dam 3 (relative to its unloaded and undeformed state) in the example is greater than half this aforementioned diametric difference. Consequently, in a projection view orientated axially—i.e. parallel—to the ring centre axis 12, the inner periphery of ring clamping portion 10 is larger than the outer periphery of implant end portion 7, although at the same time the inner periphery is smaller than an outer periphery which results on the outer side of dental dam 3 when the dental dam 3 surrounds the implant outer surface 8 of the implant end portion 7, lying slack in a single ply flush along the periphery thereof. FIGS. 11, 11a show a situation in which dental dam 3 surrounds implant outer surface 8 of the implant end portion 7, lying flush along the periphery thereof in a single ply, wherein this adjacent region of dental dam 3 is pressed against the implant outer surface 8 from the outside by means of ring clamping portion 10. Due to the relationships between the peripheries (or peripheral lengths) described earlier, the dental dam is compressed between the implant end portion 7 and the ring clamping portion 10, so that its thickness x' in this non-relaxed state is smaller than thickness x of the dental dam 3 in the relaxed or undeformed state. Because of these described geometric relationships, dental dam 3 will be pressed against the implant surface 8 of implant end portion 7 from the outside by the ring clamping portion 10, closing the periphery in sealing manner, wherein the elastic thickness compression of dental dam 3 results in a desired clamping effect. In the example (that is to say not essentially), the dental dam 3 is made of plastic which has greater strength than the rubber. In the example, implant 2 is made from metal (preferably titanium), which has greater strength than the plastic. From the preceding explanation, it is evident that the relationships described with regard to the inner periphery of the ring clamping portion 10, the outer periphery of the implant end portion 7 and the periphery resulting on the outer side of the dental dam 3 lying flush against the implant end portion 7 can realise a desired sealing and clamping effect even when the implant end portion 7 and the ring 9 have shapes which differ from the circular shape (e.g., polygonal or other). The combination described for exemplary purposes might also be described as a dental combination.

According to the preceding designs, FIG. 11a shows a preferred embodiment of an arrangement of the components of combination 1 according to the invention, which is also shown for exemplary purposes in FIG. 1a. This arrangement is obtained in a preferred operating state in which the dental dam 3 surrounds the outside of the implant end portion 7 around the entire periphery thereof, wherein the ring 9 surrounds the entire outer periphery of the dental dam 3 which encloses the implant end portion 7, and wherein the ring 9 presses the dental dam 3 which surrounds the implant end portion 7 against the implant end portion from the outside by means of the ring clamping portion 10. In the configuration described for exemplary purposes it might also be possible to speak of a dental system.

A preferred embodiment of dental tool 23 according to the invention will now be presented with reference to FIGS. 1, 5 and 6 and the following FIGS. 7-16. According to the exemplary FIGS. 1 and 7-16, the tool 23 may be used for detachable fastening of dental dam 3 to implant 2 by means of holding means 4. In the example, tool 23 comprises a tool inner part 24 and a tool outer part 25. In FIG. 1, the tool outer part is shown with part of the periphery cut away to allow a view of tool inner part 24. Tool inner part 24 and tool outer part 25 are arranged concentrically relative to a geometrical (i.e. notional) tool longitudinal centre axis 26. Tool inner part 24 has a front face 27, which may serve as a support surface against a front face of an implant end portion 7 and which to this extent faces in the distal direction (that is to say directed away from a user such as a doctor) when the tool 23 is in use. In the example, an attachment section 28 with circular cylindrical exterior extends in the proximal direction from front face 27 and serves for attaching a holding means, such as the holding means 4 described previously. An elongated portion 29 with a first outer thread 30 adjoins attachment section 28 in the proximal direction. Tool outer part 25 comprises a sleeve 31 which has a distal sleeve longitudinal end 32. The front face of this sleeve longitudinal end is flattened and thus forms a distal sleeve front face 33. A sleeve inner thread 34 which corresponds to first outer thread 30, that is to say designed for threaded engagement therewith is conformed on the inner side of sleeve 31. Axial distance a, that is to say the distance a in a direction parallel to the geometric tool longitudinal centre axis between front face 27 and the distal longitudinal end of the outer thread 30 and an axial distance b between the distal sleeve longitudinal end 32 and the proximal longitudinal end of sleeve inner thread 34 are coordinated with each other in such manner that, starting from a given relative position to tool inner part 24, tool outer part 25 is movable under the effect of the thread engagement by rotation of the tool outer part 25 relative to the tool inner part 24 far enough in a distal direction relative to the tool inner part 24 that a movement of the distal sleeve longitudinal end 32 along the attachment section 28 results therefrom. The example shown in the Figures is configured such that the tool outer part 25 may be retracted proximally far enough so that the distal sleeve longitudinal end 32 and the proximal elongated end of attachment section 28 are located in a common reference plane perpendicular to the tool longitudinal centre axis 26. The synchronisation is selected such that the tool outer part 25 is able to be shifted in the distal direction relative to the tool inner part 24 until the distal sleeve longitudinal end 32 projects distally above the reference plane E extending from the front face 27, that is to say slightly beyond the position shown in FIG. 11. In the embodiment the referenced distance a, said distance b, length $l_1$ of outer thread 30 and the length of sleeve inner thread 32 as seen to be coordinated with each other in such manner that the tool outer part 25, starting from a proximal position relative to the tool inner part, is able to be moved by rotation of the tool outer part 25 relative to the tool inner part 24 so far in the distal direction that the distal sleeve longitudinal end 32 travels the entire axial distance or length with simultaneous rotation. This makes it possible for tool outer part 25 to first be displaced proximally relative to the tool inner part far enough that at least an elongated portion protrudes axially beyond the distal sleeve longitudinal end 32 relative to a length measured parallel to the tool longitudinal centre axis 26, and a ring 9 of a holding means 4 is then attached to the axially protruding elongated portion of the attachment section 28. Then, the tool outer part 25 may be displaced distally relative to tool inner part 24 by relative rotation, so that the distal sleeve longitudinal end 32 bears axially against ring 9, and upon further rotation is able to push it axially in distal direction down from and out through the attachment section 28. For this purpose, it is provided in the example that the inside diameter $d_5$ of the distal sleeve longitudinal end 32 is larger than the outside diameter $d_6$ of the attachment section 28 and smaller than an outside diameter $d_7$ of ring 9.

Tool inner part 24 has a projection 35 which is conformed as a single part and extends centrally in the distal direction beyond front face 27. A second outer thread 36 is conformed thereon, which has a smaller thread diameter than the first outer thread 30. Projection 35 has a conical tip 37 at its distal longitudinal end, which tip is equipped in the example with multiple cutting edges 38 distributed on the periphery. As is shown clearly in FIG. 6 for example, tool outer part 25 forms a first axial end stop 39. This is a distally facing surface of a ring cover 40 conformed proximally on sleeve 31. Tool inner part 24 forms a second axial end stop 41, which is positioned opposite the first end stop 39. The second end stop 41 is a surface which faces proximally. End stops 39, 41 limit the axial movement path of tool outer part 25 relative tool inner part 24 when distal sleeve longitudinal end 32 protrudes axially slightly beyond the reference plane extending from front face 27 in the distal direction. Ring cover 40 has a central through opening 43. A projection 44 is axially displaceable to pass through this, and forms the proximal longitudinal end of tool inner part 24. Projection 44 bears a scale 45 on the outer surface thereof, wherein the number of graduations visible from the outside serves as a measure of the relative axial positions of tool inner part 24 and tool outer part 25. Of course, projection 44 might be made extended if necessary, for example to form a handle element to make handling easier.

According to a further aspect of the present invention, FIG. 6 shows a preferred embodiment of a dental set 42. In the example, this comprises the dental tool 23 described previously with reference to the figures, and the holding means 4 which was also described previously with reference to the figures, and is indicated in FIG. 6 by dashed lines. In the example, diameter $d_1$ of the circle contour 14 on which cutting edge 15 extends is slightly smaller than the outside diameter $d_6$ of attachment section 28. This yields a simple clamp and plug connection in the mounted state of ring 9, which not only serves as a retaining means on tool 23 to prevent its loss, but also enables the ring 9 to be pushed down distally away from attachment section 28 by rotation of the tool outer part 25.

According to a further aspect of the invention, a dental set 42 may for example comprise the components described with reference to FIG. 6 and also the implant 2 shown in FIG. 1a for example, and the dental dam 3 also shown there, see also FIG. 1. To this extent, a dental set 42 may comprise for example the combination 1 shown in FIG. 1a and the dental tool 23 represented for example in FIG. 4.

The implant 2 shown in FIGS. 1, 1a has a recess 46 on its proximal implant end portion 7, which recess is open at the proximal longitudinal end and has an inner thread 47 conformed on the inside thereof. Inner thread 47 is designed to enable a fit for threaded engagement with the second outer thread 36 conformed on projection 35. In the example, the frontal face outside diameter $d_6$ (i.e. relative to front face 27) of the attachment section 28 fits the frontal face outside diameter $d_4$ of the implant outer surface 8 of implant end portion 7. This makes it easier to shift the ring 9 from attachment section 28 to implant end portion 7.

With reference to FIGS. 7-16, a preferred mode of operation and a possible application example of the components described previously are presented. Like the earlier figures, these are also simplified schematically and are not to scale. FIG. 7 shows a cross section through an area of a jawbone 6 which is covered on the outside with gingiva 49. The implant 2 described earlier has been inserted in the jawbone 6.

In the method step that follows, shown in FIG. 8, the proximal longitudinal end of the implant 2 and the adjacent outside area (jawbone 6 I gingiva 49) are covered with a dental dam 3.

In a subsequent method step or operating state, shown in FIG. 9, dental tool 23 has been screwed onto the proximal longitudinal end of the implant 2 while separating and penetrating dental dam 3. For this purpose, first the dental dam 3 has been split with tip 37 and the cutting edges 38 formed thereon, so that the elongated portion of projection 35 with outer thread 36 can be pushed through the opening formed in the dental dam 3 and screwed into inner thread 47. Since in the example the effective torque resistance between the first outer thread 30 and the sleeve inner thread is greater than the torque resistance between outer thread 36 and inner thread 47, when the tool is screwed into implant 2 it may also optionally be grasped at the tool outer part 25. The screwing depth is selected such that the front face 27 of tool inner part 24 bears flat against dental dam 3, which in turn lie flat on the proximal front face of implant end portion 7. Before the tool 23 was screwed on, tool outer part 25 was brought into its proximal limit position relative to tool inner part 24, and ring 9 of a holding means 4 is pushed onto attachment section 28 until it abuts axially against the distal sleeve longitudinal end 32.

FIG. 10 shows an operating state as the result of a subsequent method step. In this contact, tool outer part 25 has been moved in distal direction relative to tool inner part 24, so that the ring 9 has already been pushed partly off the attachment section 28 by the distal sleeve longitudinal end 32 and onto the implant end portion 7. As FIG. 10 shows, in this process dental dam 3 is clamped peripherally in a single ply and flat in the annular gap formed between ring clamping portion 10 and implant end portion 7. If the rotation of tool outer parts 25 relative to tool inner part 24 is continued, ring 9 is finally pressed completely off attachment section 28 and pushed onto the implant end portion. This is shown in FIG. 11 and the enlarged inset of FIG. 11a.

FIG. 12 shows a later operating state, in which, starting from the position of FIG. 11, tool 23 has been unscrewed from implant 2 again and removed from the treatment site together with a portion 50 of the dental dam cut out by cutting edge 15. In the subsequent operating state shown in FIG. 13, in a further process stop a superstructure 51, which is a sleeve 52 with a continuous inner screwing channel 53, has been placed on the proximal front face of implant 2. Superstructure 51 has been screwed tight to the implant 2 with a screw 54 whose outer thread mates with inner thread 47.

Figure 14:
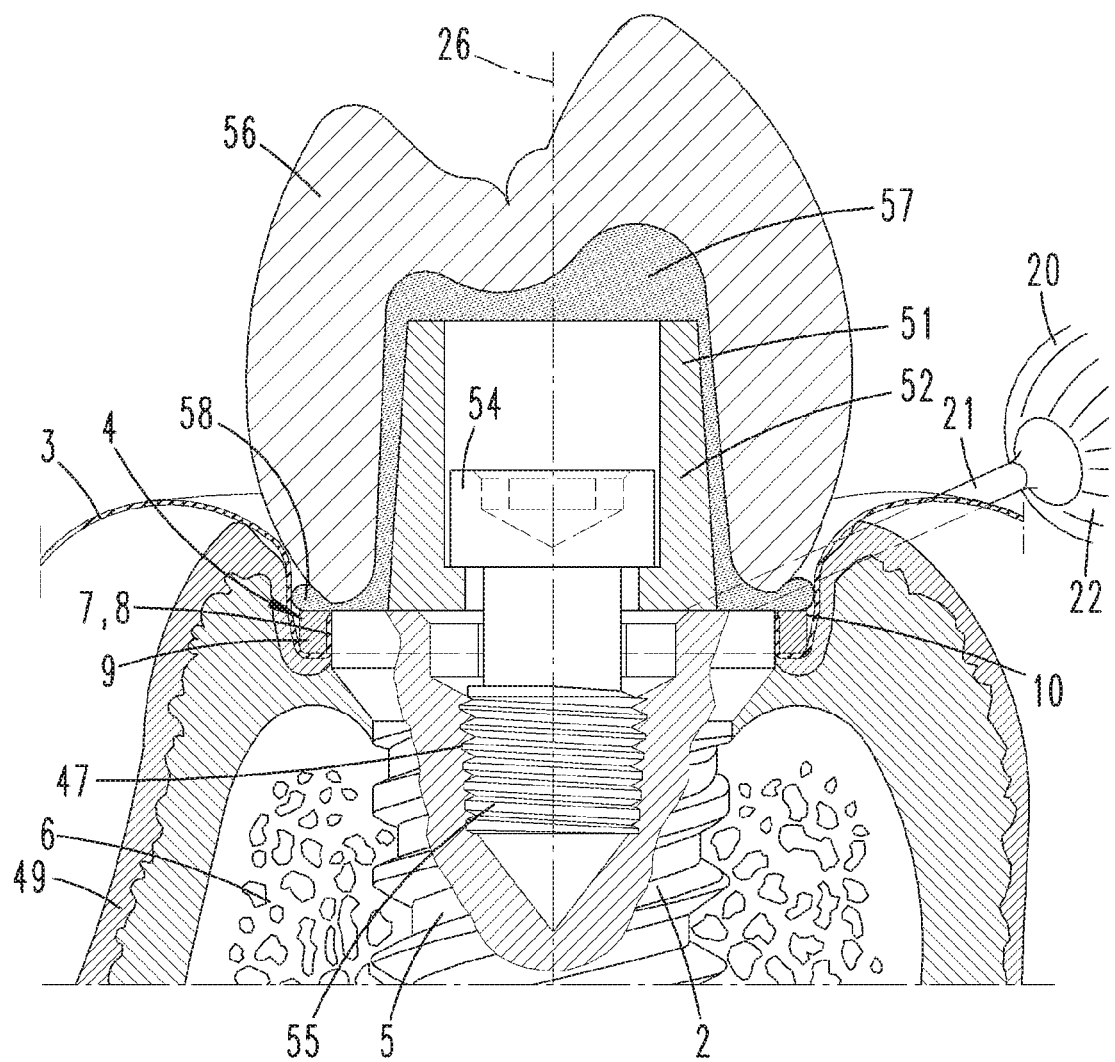
FIG. 14 an example of a further preferred operating state, in which, starting from the situation shown in FIG. 13, a crown has been affixed to the implant and the FIG. 15 an example of a further preferred operating state, in which, starting from the situation shown in FIG. 14, the holding means has been removed.

Starting from this situation, in order to reach the later operating state shown in FIG. 14, a crown 56 has been affixed on implant 2 and superstructure 51 using a cement designed for dental applications. It is clearly shown that a bead 58 of cement 57 escapes at the lateral edge of the adhesion zone. It is also shown that the bead 58 is screened completely from the jawbone 6 and the gingiva 49 by dental dam 3, so no undesirable contact can occur.

Figure 15:
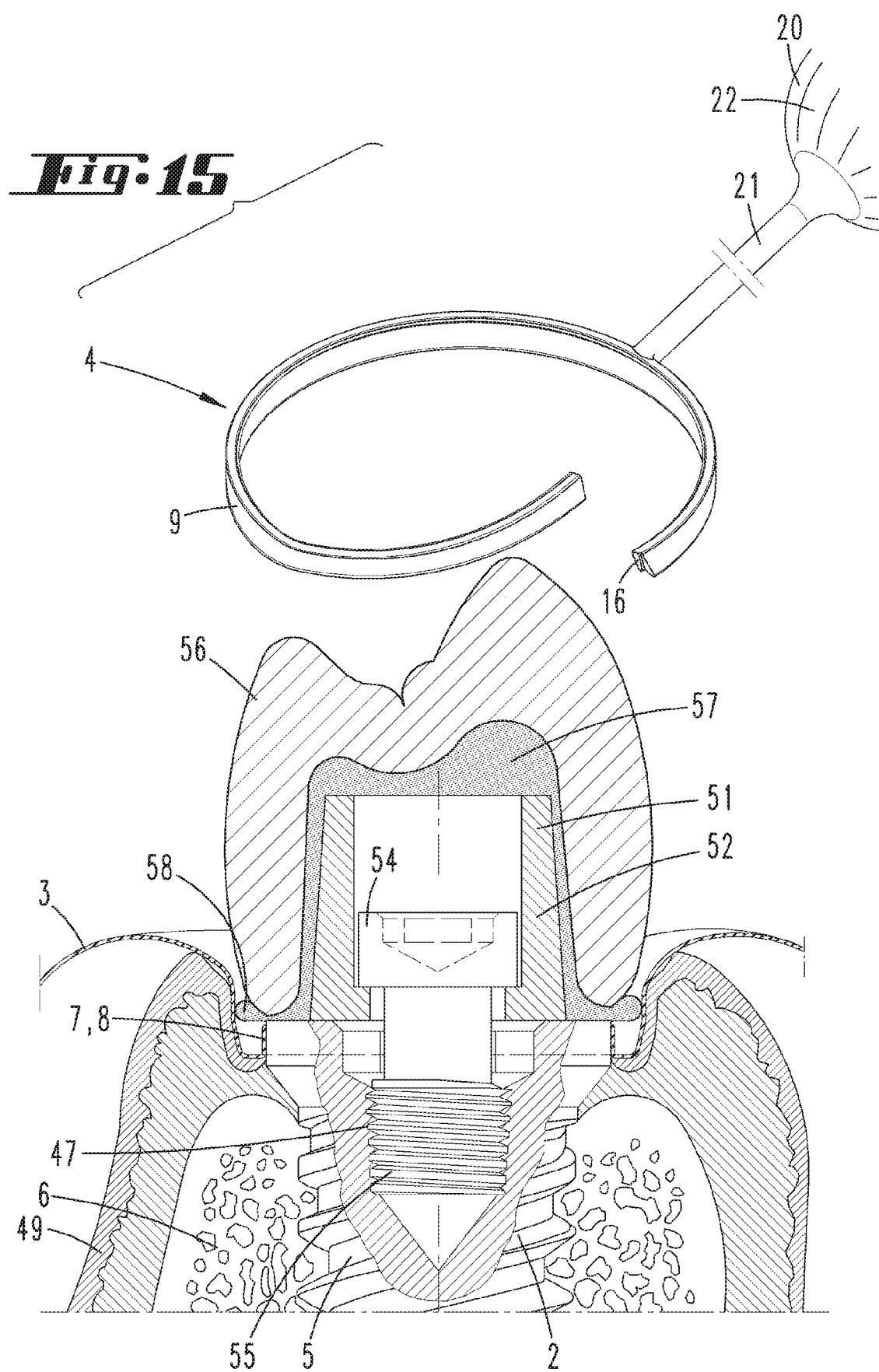
Figure 16:
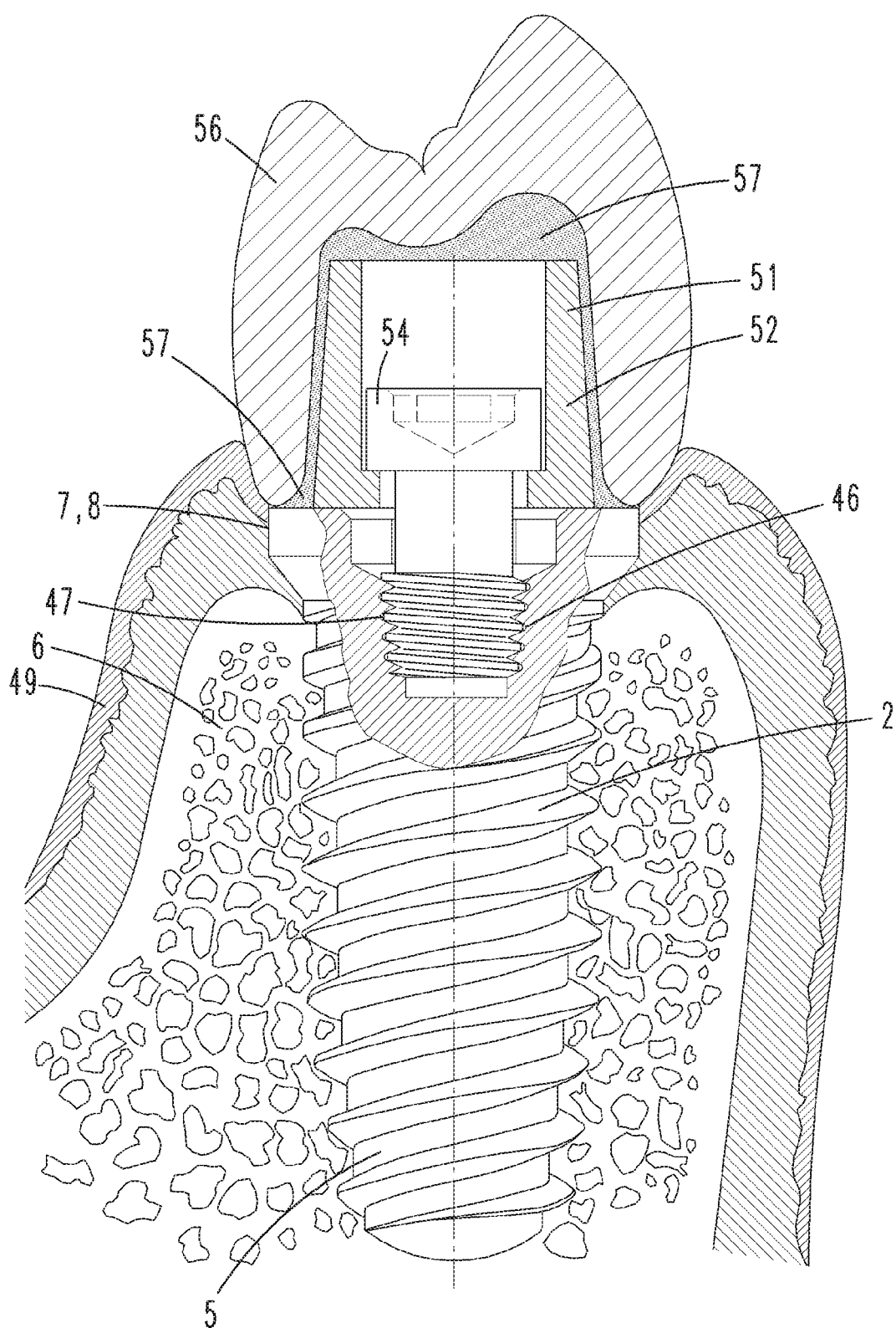
FIG. 16 an example of a further preferred operating state, in which, starting from the situation shown in FIG. 15, the dental dam surrounding the implant and a cement overflow escaping from the adhesive joint have been removed and healing has taken place, FIG. 17 a perspective view of a dental tool according to the invention according to a further preferred embodiment which comprises a plug-in adapter and two cutting edge adapters.

In a subsequent method step, in order to reach the later operating state shown in FIG. 15, holding means 4 has been removed from the system described earlier. For this, an outwardly acting tensile forces was applied to ring 9 via handle 20 until the effective force resulted in a desired failure at predetermined break point 16. After ring 9 breaks at the predetermined break point 16, holding means 4 can simply be pulled away. In this state also, the jawbone 6 and the gingiva 49 are completely shielded from the cement 57 or bead 58 by dental dam 3. In the operating state shown in FIG. 15, the dental dam 3 can also be removed without difficulty, particularly after it has been cut open at the side. FIG. 16 shows the implant inserted in the jawbone 6 with superstructure 51 and crown 56 positioned on top in the finished state.

Figure 17:
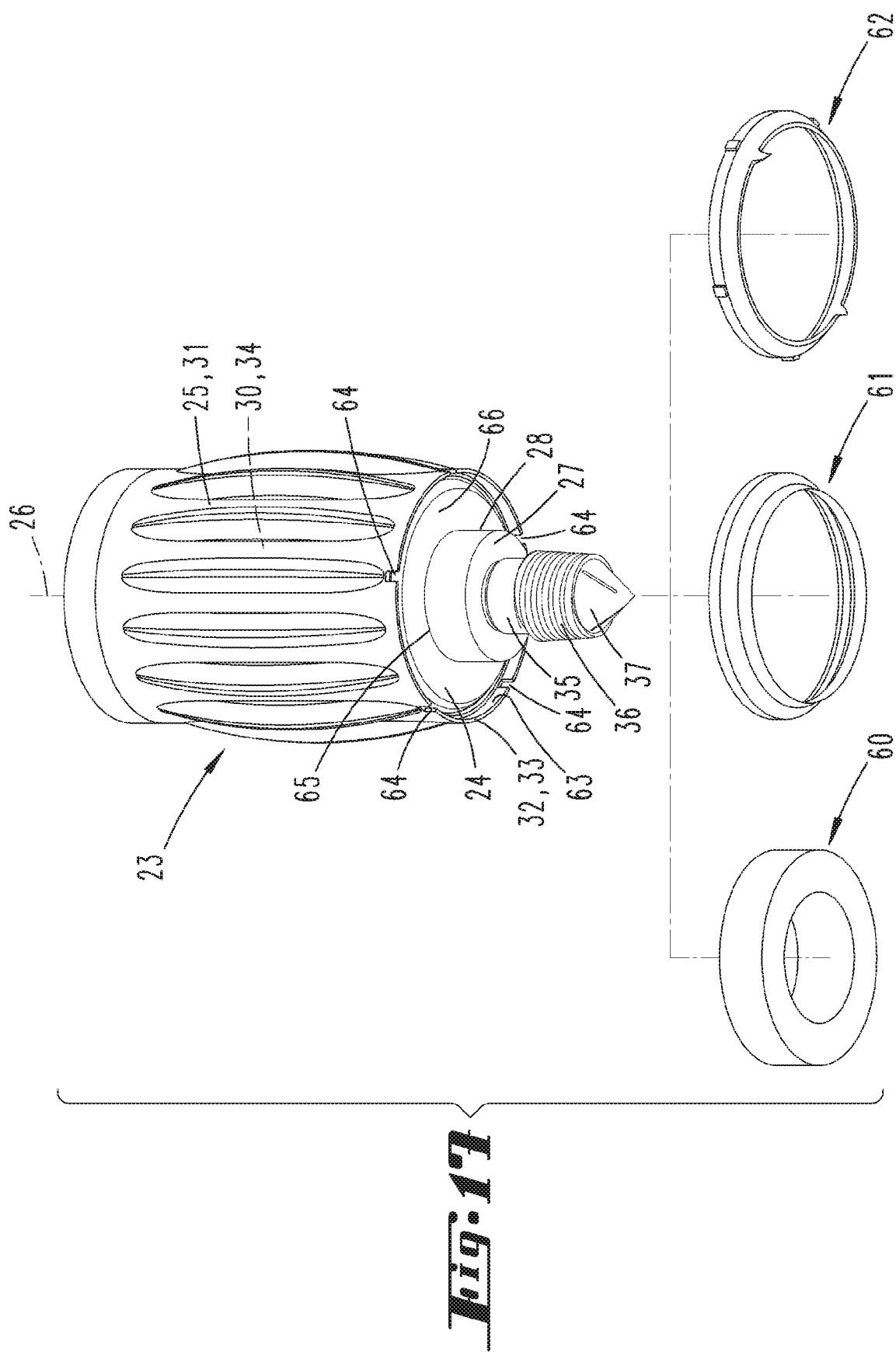
Figure 18:
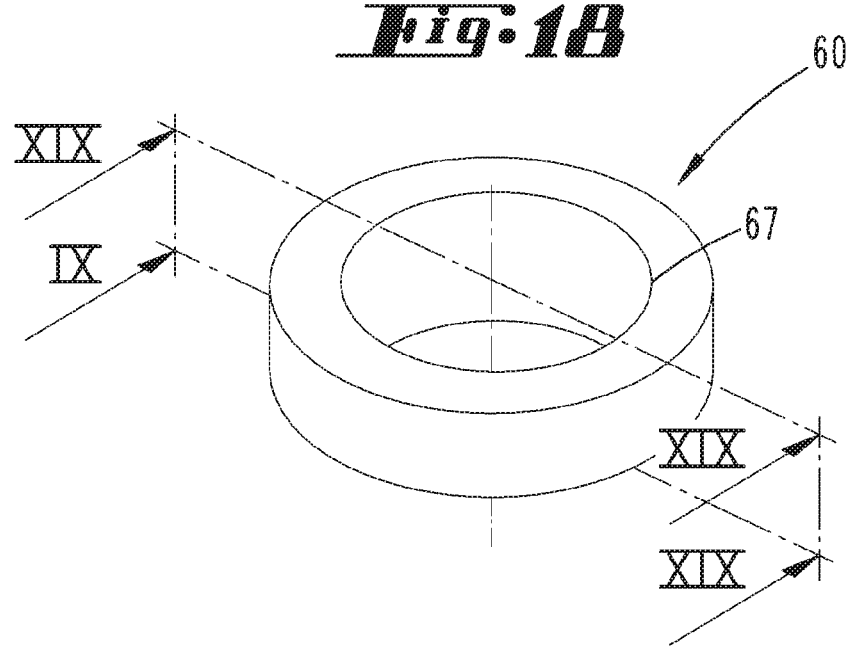
FIG. 18 a perspective view of the plug-in adapter of FIG. 17 in an enlarged view thereof.
Figure 19:
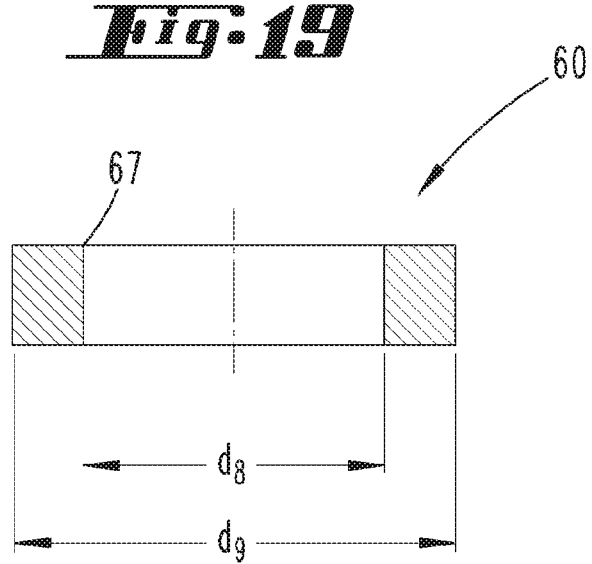
FIG. 19 a cross-sectional view along section plane XIX-XIX from FIG. 18.

FIG. 17 is a schematic representation of a further preferred embodiment of a dental tool 23 according to the invention. Here, as also in the following figures, features which correspond to the features illustrated in earlier figures or optional alternative features are designated with the same reference signs. The tool 23 shown in FIG. 17 differs from the tool 23 shown in the previous figures in that it has a relatively thinner attachment section 28, and that the tool 23 comprises a plug-in adapter 60 and two different cutting attachments 61 and 62 as components for optional fastening shown schematically and unattached in FIG. 17.

The relatively slender design of attachment section 28 offers advantages for further possible uses of tools 23. For example it enables the range of applications to be expanded to include the removal of gingiva from the upper surface of an implant which is often necessary after it has been assimilated. This will also be discussed in greater detail with reference to the following figures. In this context, it is advantageous that a larger distance is formed between the attachment section 28 and the sleeve 31 relative to directions radial to the tool longitudinal centre axis 26 than in the tool 23 shown in earlier figures, so that the attachment section 28 may initially be surrounded by gingiva.

The distal sleeve longitudinal end 32 has an inwardly facing surface 63 which forms an inner contour extending along a circle contour in a cross sectional contour perpendicular to the tool longitudinal centre axis 26. The inner contour extends along the periphery around the tool longitudinal centre axis 26 with a constant radial distance d from the tool longitudinal centre axis 26 except for recesses 64 which are formed at intervals on the periphery thereof. Attachment section 28 has a cylindrical outer surface. This outer surface has a circular external contour in a cross sectional plane perpendicular to the tool longitudinal centre axis 26, which contour extends along the periphery around the tool longitudinal centre axis 26 with a constant radial distance c from the tool longitudinal centre axis 26. The dimensions are chosen from values which fulfil a ratio between d and c in a value range from 1.1-2.

Tool inner part 24 forms a surface 66 perpendicular to the tool longitudinal centre axis 26 at the longitudinal end 65 of the attachment section 28 axially farthest from the front face 27. This may serve for example as an axial bearing or support surface for the plug-in adapter 60 when it is used.

The plug-in adapter 60 shown in FIGS. 17 to 20 may be plugged in self-locating manner into attachment centre 28 without clearance when needed to obtain a lightly clamped seating. Plug-in adapter 60 has a cylindrical inner surface, i.e. a circular internal ring contour 67 (see FIGS. 18, 19) whose diameter $d_8$ is designed to fit the outer diameter of attachment section 28 for this purpose.

Figure 20:
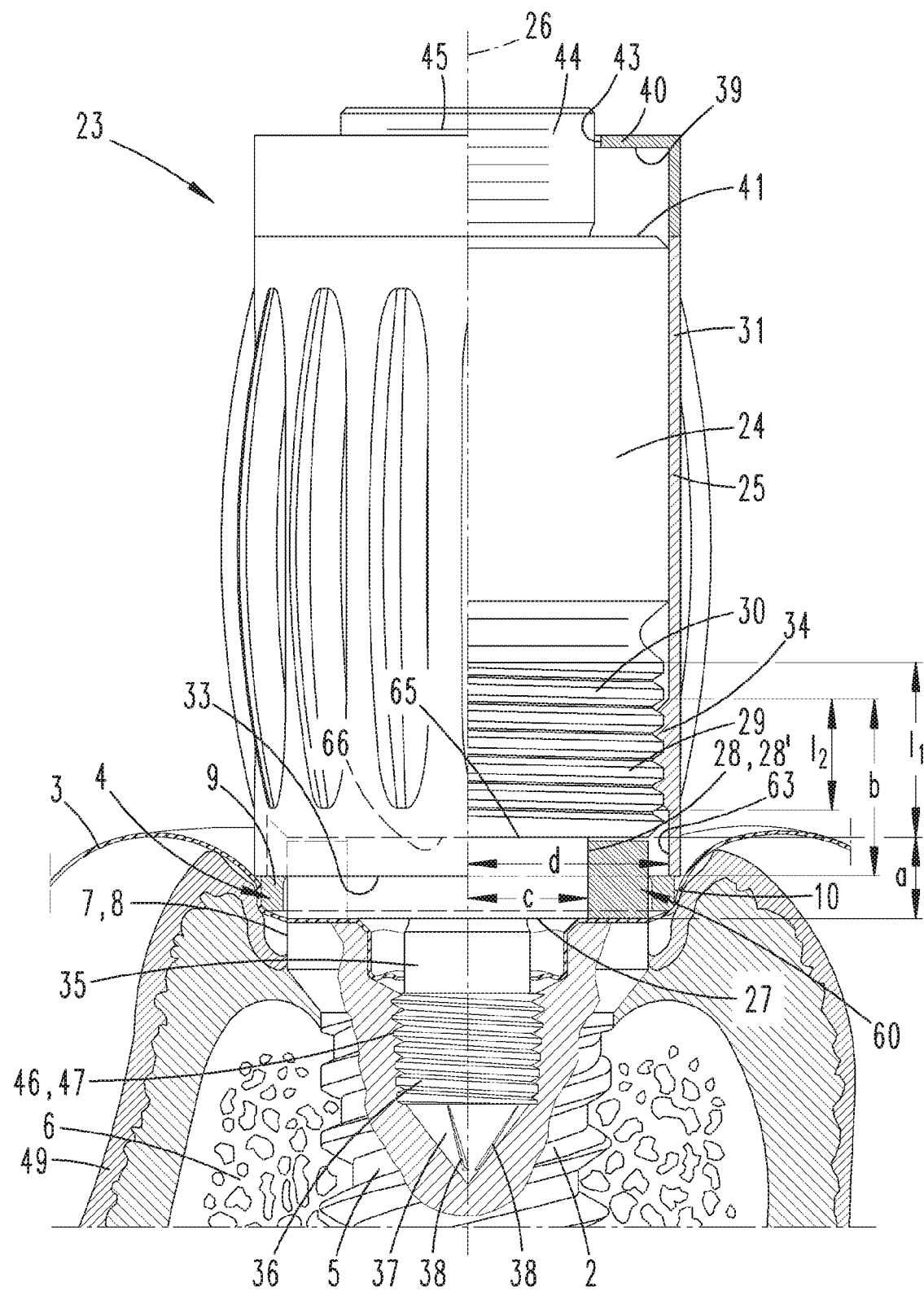
FIG. 20 half in side view and half in cross sectional view in each case, the dental tool shown in FIG. 17 with attached plug-in adapter and in a preferred operating state in conjunction with an implant, a dental dam and a holding means.

The exemplary preferred operating state shown in FIG. 20 is similar to the operating state described with reference to FIG. 9 of the tool 23 shown in that figure. To this extent, reference it mad to the earlier description. In this context, tool 23 is used to fasten a cofferdam 3 to an implant outer surface 8 of an implant end portion 7 via a holding means 4. The difference consists in that in the example of FIG. 20 the holding means 4 is not mounted directly on attachment section 28. Instead, plug-in adapter has been plugged into the comparatively thinner attachment section 28, and annular holding means 4 has been attached to the outside thereof. The combination of tool 23 and holding means 4 forms an embodiment of a dental set 42 according to the invention. For this, diameter $d_9$ of the cylindrical outer surface of plug-in adapter 60 corresponds to the outside diameter of implant outer surface 8.

Figure 21:
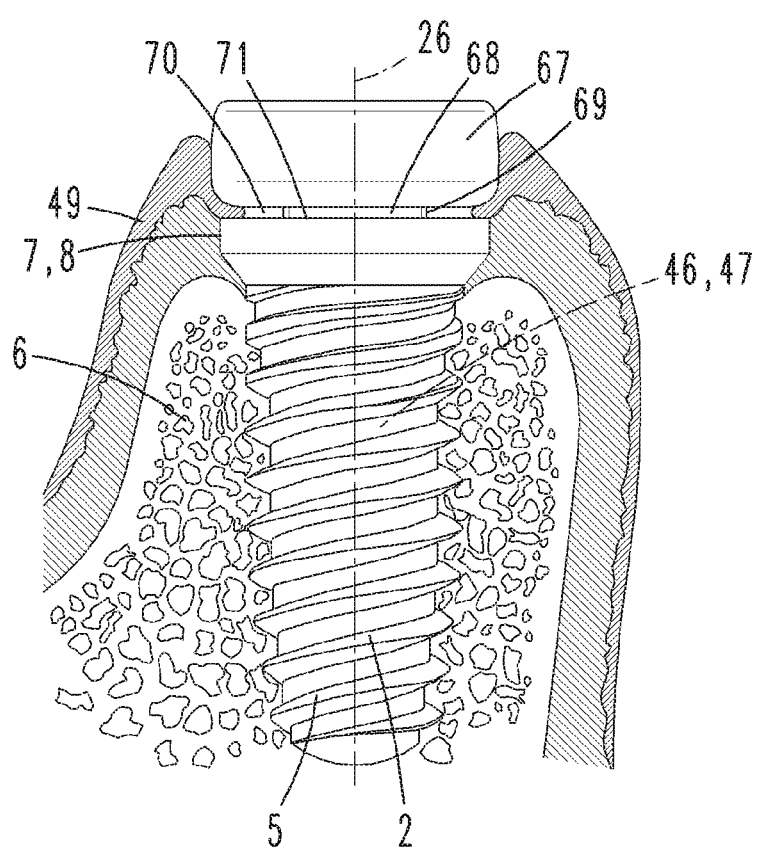
FIG. 21 in a partially cutaway view, a jaw area in which an implant is inserted, wherein and into which a healing cap is screwed.
Figure 22:
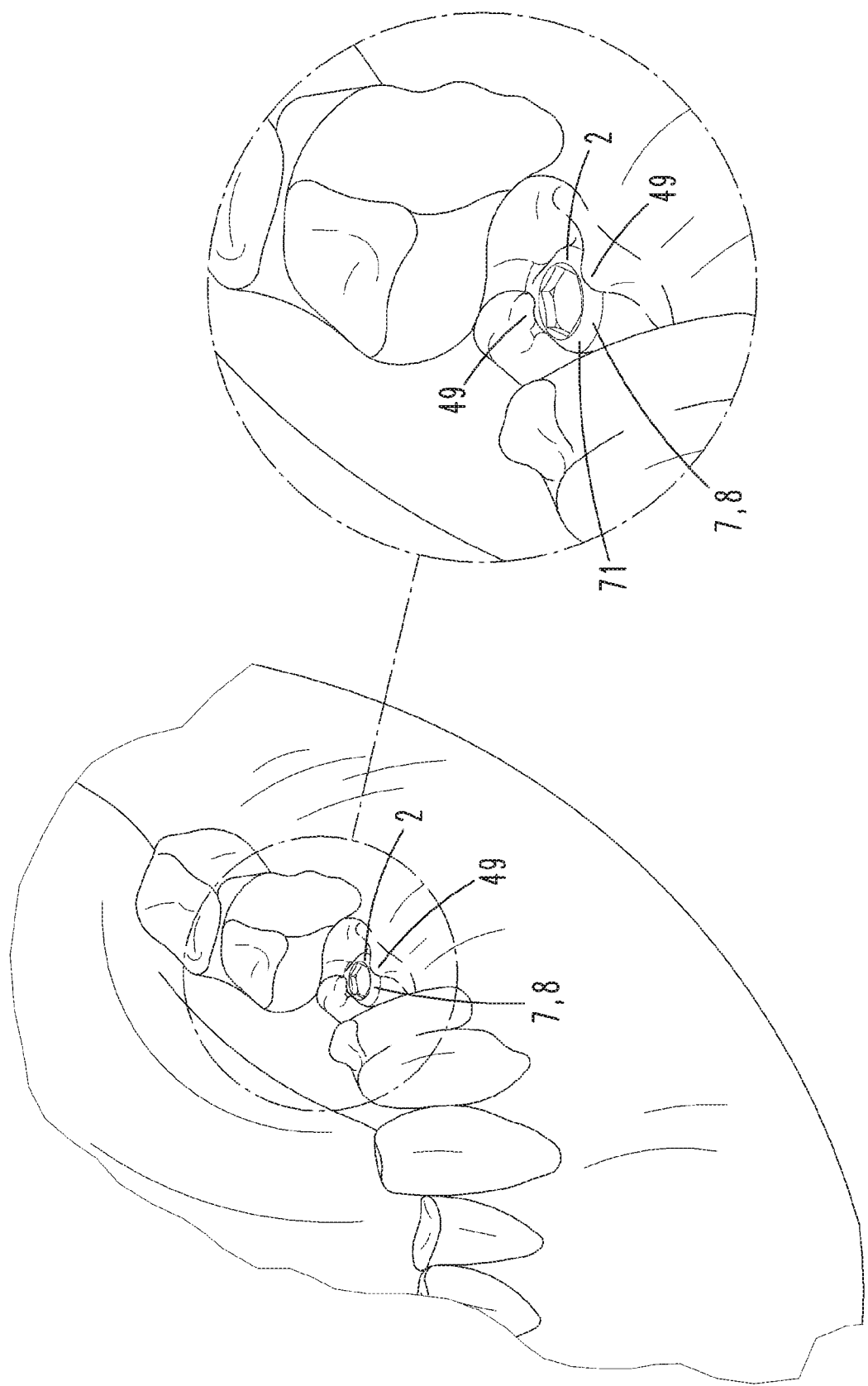
FIG. 22 a perspective top view of the jaw area shown in FIG. 21, after removal of the healing cap.

FIG. 21 shows an enlarged partial section through a jaw region. An implant 2 has been inserted in jawbone 6. For the assimilation phase, a healing cap 67 has been mounted detachably on implant 2. For this purpose, the healing cap 67 shown in FIG. 21 has a shaft 68 with an outer thread 69, which is screwed into the inner thread 47 (see also FIG. 23) in implant 2. In the situation shown in FIG. 21, the threaded connection, starting from an initially firmly screwed state, has become somewhat looser, so that a gap 70 has formed, in which in the illustration the shaft 68 with outer thread 69 is visible. If such an unintended loosening occurs, as shown schematically in FIG. 21 the danger exists that gingiva 49 will advance from the outer border into the gap 70. If the healing cap 67 is unscrewed after the end of the assimilation phase of implant 2, as shown schematically in FIG. 22 it can happen that an implant front face 71 is partly covered with gingiva 49 advancing from the outer border. This complicates the subsequent treatment in which the superstructure 51 is mounted on the implant 2 and a crown 56 affixed on top of that (see for example FIG. 14). For a desired subsequent treatment, therefore, the gingiva 49 that has encroached over the borders must first be removed. This can be done advantageously with the dental tool 23 shown in FIG. 17 using the cutting edge attachment 61 thereof. This is illustrated as a separate part in FIGS. 25, 26. It comprises an annular base body 72 which has a mounting section 73 and a cutting edge 74 at the longitudinal end farthest therefrom. The mounting section 73 is cylindrical and, as shown in the partial cutaway of FIG. 23, may be inserted in a peripheral recess 75 conformed around the sleeve 31 starting from the distal sleeve longitudinal end 32, so that a concentric alignment of the cutting edge attachment 61 and at the same time a light clamping effect are achieved due to the coordinated diameters of sleeve 31 and mounting section 73. To this extent, mounting section 73 is also a centring section 76. In the example, an outside diameter of the centring section 76 and an inside diameter of the sleeve 31 are fitted to each other in the region of recess 75 to achieve a slight transition tolerance.

Figure 23:
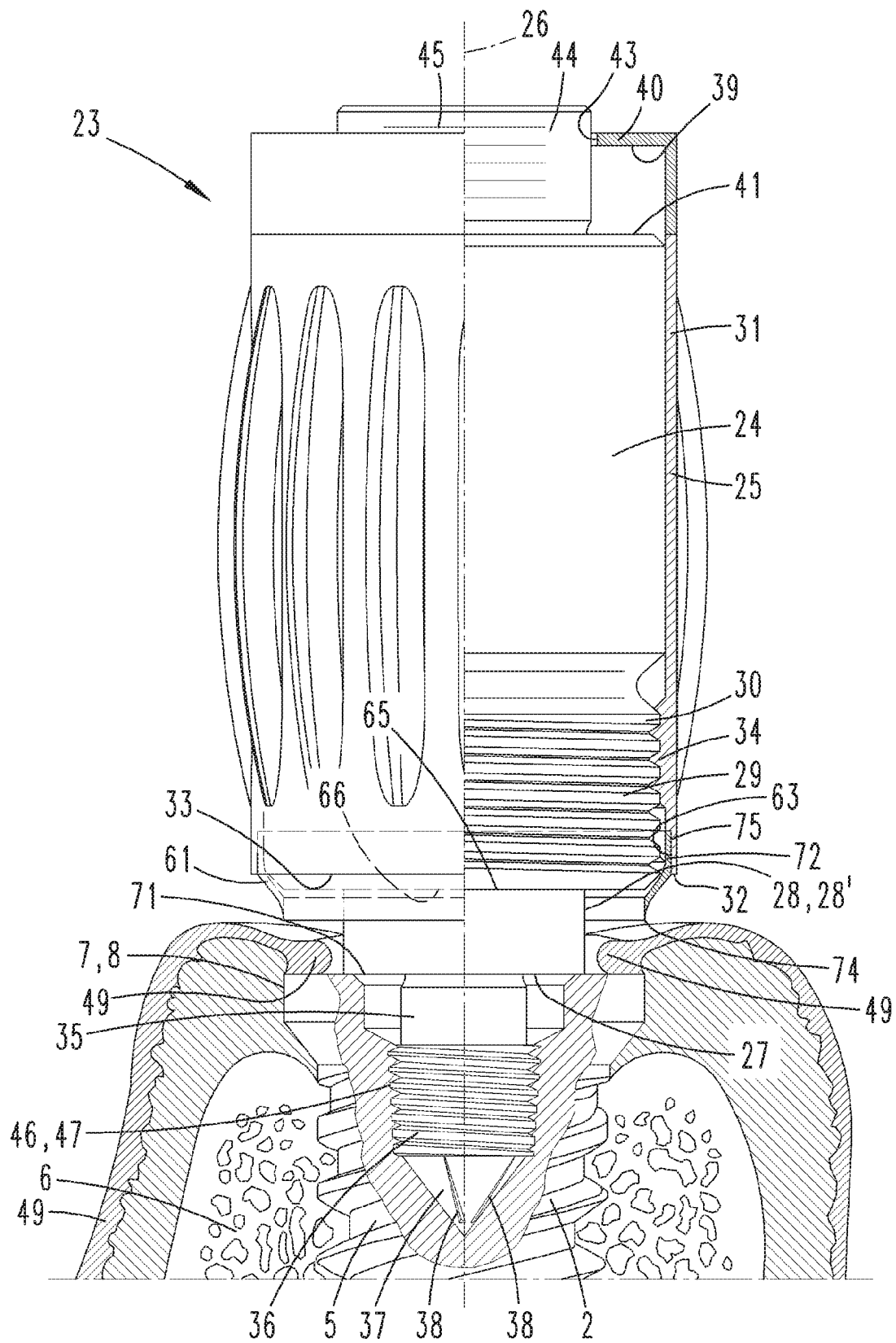
FIG. 23 half in side view and half in cross sectional view in each case, the dental tool shown in FIG. 23, wherein a cutting attachment circular cutting edge is attached to the tool outer part thereof, in an exemplary preferred operating state.
Figure 24:
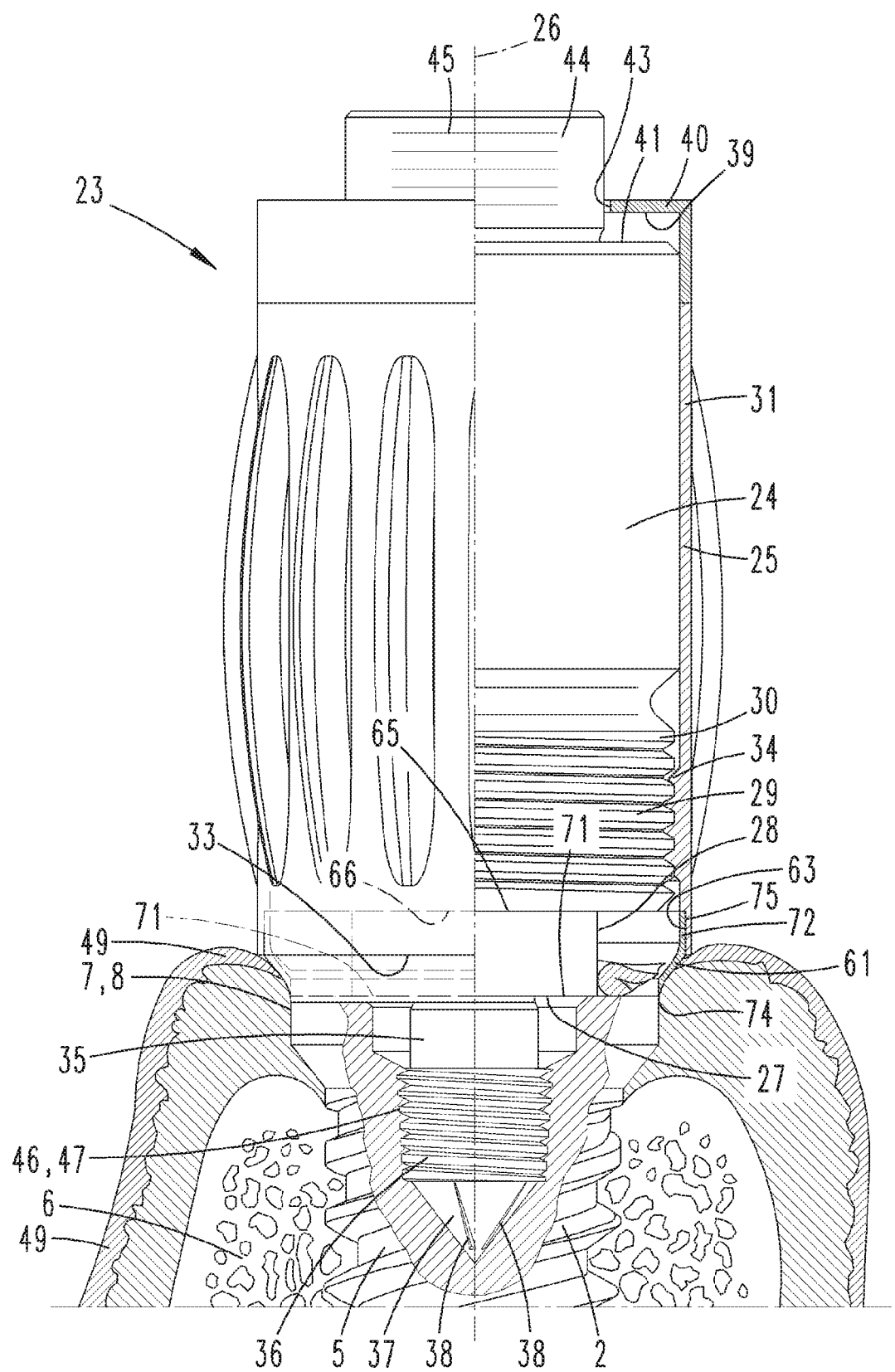
FIG. 24 an exemplary preferred operating state which follows the operating state shown in FIG. 23.

FIG. 23 shows a first preferred operating state in which tool 23 has been screwed into inner thread 47 of implant 2 by means of its outer thread 36 deeply enough for the front face 27 of attachment section 28 to be pressed against implant front face 71. In this way, tool 23 may be aligned with implant 2 and attached detachably thereto. Dental tool 23 and implant 2 are components of a dental set 42 which may include further components as necessary. In FIG. 23, an axial position of the sleeve 31 relative to the tool inner part 24 is selected by means of outer thread 30 and sleeve inner thread 34, in which the cutting edge 74 is still at a distance from gingiva 49, which protrudes from the outside over the implant front face 71. Starting from this operating position, if sleeve 31 is twisted into tool inner part 24 in the correct twisting direction corresponding to the thread pitch, an additional axial movement of the sleeve 31 in the direction towards implant 2 is also caused, the course of which results in the annular cutting edge 74 penetrating the gingiva 49 and the gingiva 49 which protrudes over the implant front face 71 like a bead is severed. In this context, it is preferred (although not essential) that the plug connection between mounting section 73 and sleeve 31 creates a clamping force that is only sufficient to hold the cutting edge attachment 61, but not sufficient to cause the cutting edge attachment 61 to be entrained rotationally by the rotation of sleeve 31. To this extent, it is preferred that the cutting attachment 61 is held away from the gingiva 49 in the peripheral direction and cuts entirely or mainly with an axial cutting movement like a die cutter. Starting from the operating state shown in FIG. 24, the tool 23 may be unscrewed from the implant 2 and the severed gingiva 49 removed. Them the cutting attachment 61 may be detached from the sleeve 31 and the tool 23 can then be put to some other use. It is preferred that as shown in FIG. 20, plug-in adapter 60 is then connected to attachment section 28, and a holding means 4 is mounted on the outside thereof, and that the tool 23 is thus used for fixing a dental dam 3 in place on the implant end portion 7. In the case of the tool 23 shown for example in FIG. 23, for this purpose the tool inner part-elongated portion 28' extending axially from the outer thread 30 as far as the front face 27 is embodied as an attachment section 28. Alternatively, it is conceivable that the tool inner part-elongated portion 28' may be of any other desired construction; even if a design of tool 23 other than the one shown in FIG. 20 means that a plug-in adapter 60 cannot be used, the tool 23 may be suitable for the cutting treatment described previously.

Figure 28:
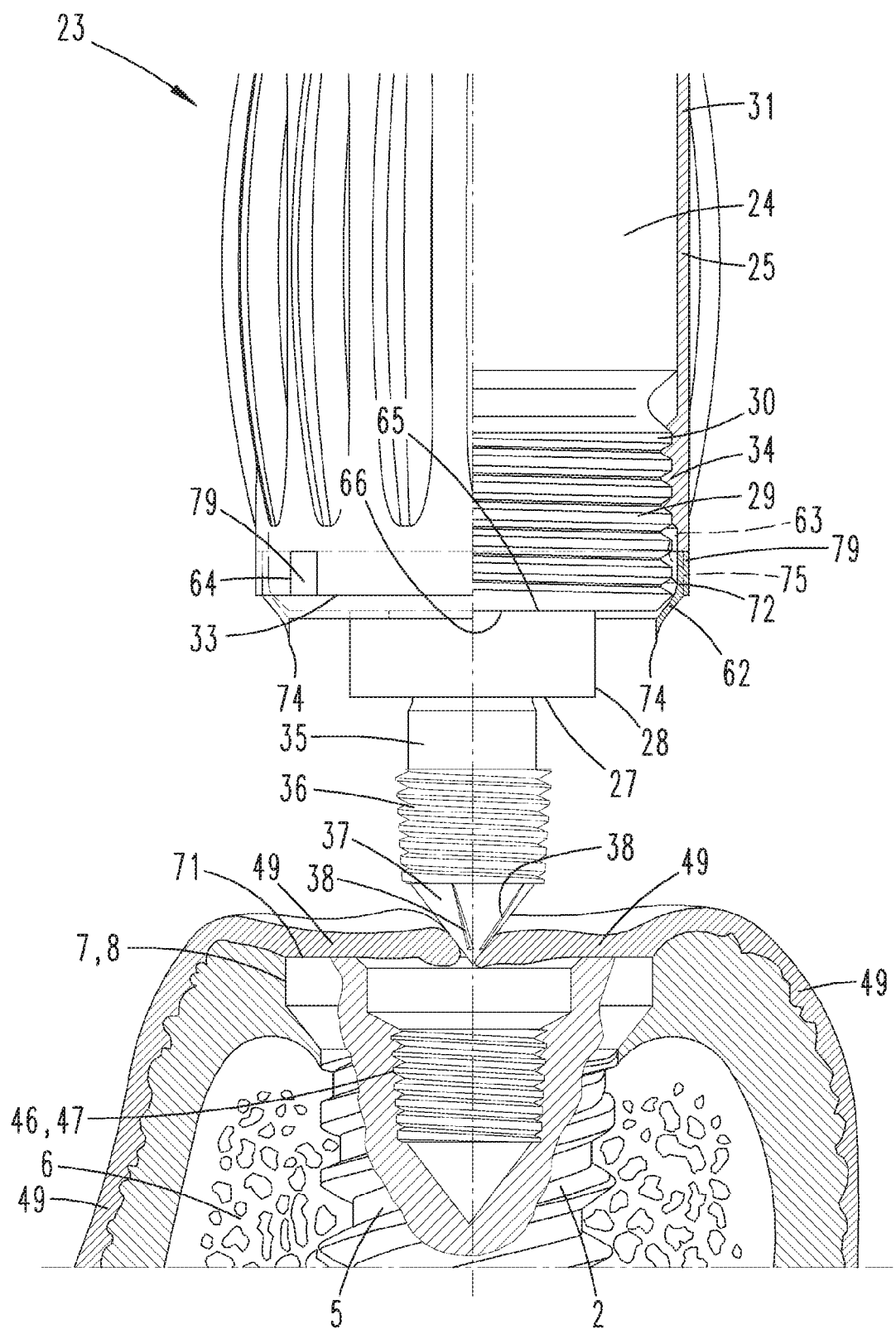
FIG. 28 half in side view and half in cross sectional view in each case, the dental tool shown in FIG. 17, wherein a cutting attachment with two scalpels is attached to the tool outer part thereof, in an exemplary preferred operating state.
Figure 30:
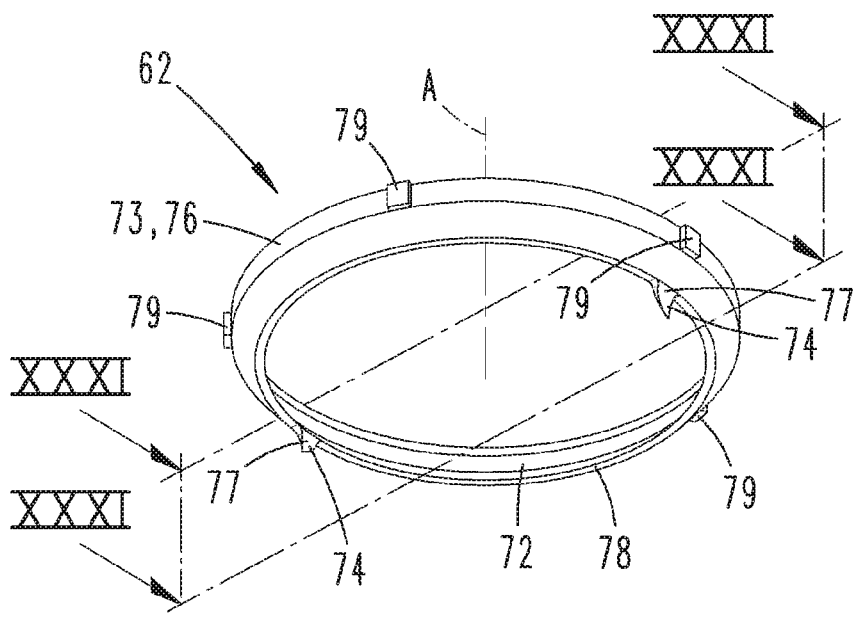
FIG. 30 a perspective view of the in FIGS. 28, 29 with represented cutting attachment.
Figure 31:
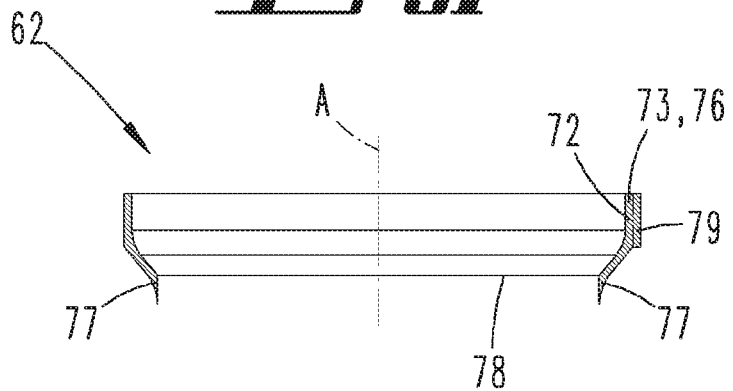
FIG. 31 a sectional view along a section plane XXXI-XXXI as shown in FIG. 30.

FIG. 27 shows a partial section through a jawbone 6, in which an implant 2 has been inserted, but unlike the example of FIG. 21 without a healing cap. The result of this is that after the end of the assimilation phase the implant front face 71 is entirely covered by gingiva 49. Given this status, in order to first affix a superstructure 51 and then a crown 56 on implant 2, the gingiva 49 covering implant front face 71 must be removed. FIG. 28 shows schematically that this is advantageously possible with the dental tool 23 shown in FIG. 17 and the cutting attachment 62 thereof. This is shown in FIGS. 30 and 31 as a separate part, wherein for the sake of simplicity most of the same reference signs have been used as for cutting ring 61. Cutting attachment 62 comprises a base body 72, of which the mounting section 73 also serves as a centring section 76. Like the cutting attachment 61, cutting attachment 62 also tapers towards the longitudinal end thereof farthest from the mounting section 73. One difference from cutting attachment 61 consists in that cutting attachment 62 does not have a circular cutting edge. Instead, the cutting attachment 62 conformed integrally in the example has two opposing scalpel projections 77 on its periphery, each of which extends from an annular front face 78 along a geometric centre axis A of the cutting edge attachment 62. The scalpel projections are shaped like hooks, wherein one side of the hook in each case is constructed as a cutting edge 74. Cutting attachment 62 is constructed as a single part. Multiple projections 79 arranged peripherally protrude laterally outwards from the mounting section 73 thereof. Multiple recesses 64 arranged peripherally on the distal sleeve longitudinal end 32 are assigned to the projections 79. The recesses 64 and the projections 79 are coordinated with each other in such manner that one projection 79 engages in each recess 64 when, as shown in FIG. 28, the cutting attachment 62 with its mounting section 73 is inserted in the substantially annular recess 75 of the distal sleeve longitudinal end 32. This results in a rotationally rigid connection between cutting attachment 62 and sleeve 31. Recess 75 forms an annular space and the axial depth thereof is limited by a ridge in sleeve 31. The ridge forms an axial end stop for the cutting attachment 62, as also in FIG. 23 for cutting attachment 61. In the axial overlap area, the outside diameter of the mounting section 73 and the inside diameter of the sleeve 31 are coordinated to achieve a slight transition tolerance. On the scalpel projections 77, the cutting edges 74 are formed on each of the two scalpel sides which move forwards peripherally when sleeve 31 is rotated relative to the tool inner part 24 in a direction which causes an axial relative movement of sleeve 31 in the direction towards projection 35 as a consequence of the thread engagement. By virtue of this variation, such a rotating movement causes the simultaneous advance of cutting edges 74 in a peripheral direction and in an axial direction. To this extent, the projections 79 constitute first means, and the recesses 64 constitute second means which when the cutting edge attachments 62 is mounted on the sleeve 31 create a rotary form fit of the cutting edge attachment 62 relative to sleeve 31.

Figure 29:
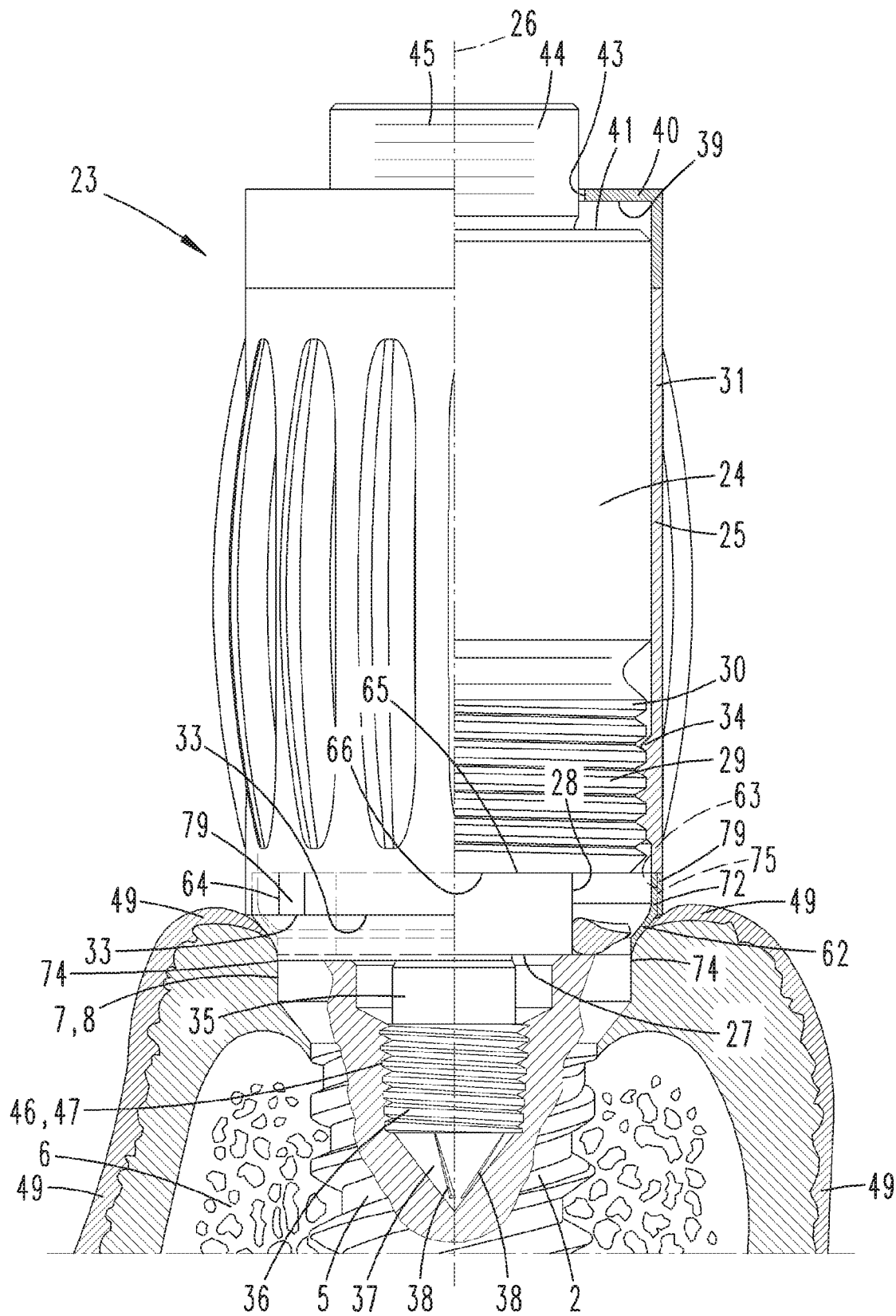
FIG. 29 an exemplary preferred operating state which follows the operating state shown in FIG. 28.

FIG. 28 shows schematically that the tool can first be used by means of its tip 37 and the cutting edges 38 to split the gingiva 49 that is covering the implant front face 71, in the middle for example and push it to one side. This makes it possible for the outer thread 36 of the tool inner part 24 to be screwed into the inner thread 47 in the implant 2 until the front face 27 of the tool inner part 24 bears axially on the implant front face 71 at a certain screw-in depth. In this way, it is possible to fasten and centre the tool 23 on the implant 2. Then, the sleeve 31 may be twisted relative to tool inner part 24 so that the sleeve 31 also moves axially towards the implant 2. Cutting edges 74 are moved in a helical pattern and create a peripheral incision in the gingiva 49. This is shown in FIG. 29. The gingiva 49 covering implant front face 71 is separated from the rest of the gingiva 49 and can be removed after the tool 23 has been unscrewed and detached. To this extent, the cutting attachment 62 might also be described as an exposing tool.

FIGS. 32 to 34 show a further preferred embodiment of an invention according to tool 23. As is shown particularly in the partial cutaway in FIG. 33, scalpel projections 79 are conformed integrally on the annular distal sleeve longitudinal end 32 there, each having one cutting edge 74. The tool 23 shown in FIGS. 32 to 34 therefore does not have a detachable cutting attachment 62. As is shown in FIGS. 33, 34, however, it may still be used to cut a circular section out of gingiva 49 as described previously.

In the embodiments described, the one or more circular cutting edge(s) 74 formed on the scalpels 79 are designed in such manner that when tool 23 is used an incision is created along a circular line, the diameter of which preferably corresponds to the outside diameter of the implant outer surface 8 of implant 2.

All disclosed features are (individually and in any combination with each other) essential to the invention. The contents of disclosure of the associated/accompanying priority documents (transcript of the prior application) are herewith also incorporated in the disclosure of this application in their entirety, also for the purpose of including the features of those documents in the claims of the present application. With their features, the subordinate claims also characterize independently substantive inventive refinements of the related art, particularly for the purpose of submitting partial applications on the basis of said claims.

List of reference signs

1 Combination
2 Implant
3 Dental dam portion

List of reference signs

4 Holding means
5 Threaded portion
6 Jawbone
7 Implant end portion
8 Implant outer surface
9 Ring
10 Ring clamping portion
11 Ring through opening
12 Geometric ring centre axis
13 Ring cutting section
14 Geometric circle contour
15 Cutting edge
16 Predetermined break point
17 Inner surface
18 Section
19 Transverse plane
20 Handle
21 Handle bar
22 Handle end
23 Dental tool
24 Tool inner part
25 Tool outer part
26 Tool longitudinal centre axis
27 Front face
28 Attachment section
28' Tool inner part elongated portion
29 Elongated portion
30 External outer thread
31 Sleeve
32 Distal sleeve longitudinal end
33 Distal sleeve front face
34 sleeve inner thread
35 Projection
36 Second outer thread
37 Tip
38 Cutting edges
39 Axial end stop
40 Ring cover
41 Second end stop
42 Dental set
43 Through opening
44 Projection
45 Scale
46 Recess
47 Inner thread
49 Gingiva
50 Dental dam portion
51 Superstructure
52 sleeve
53 Screwing channel
54 Screw
55 Outer thread
56 Crown
57 Cement
58 bead
59 Chamfer
60 Plug-in adapter
61 Cutting attachment
62 Cutting attachment
63 Surface
64 Recess
65 Longitudinal end
66 Surface
67 healing cap
68 Shaft
69 Outer thread
70 Gap
71 Implant front face
72 Base body
73 mounting section
74 cutting edge
75 Recess
76 Centring section
77 scalpel projection
78 annular Front face -continued List of reference signs 79 projection
a distance
b distance
c radial distance
d radial distance
$d_1$ Diameter
$d_2$ Inside diameter
$d_3$ Outside diameter
$d_4$ Outside diameter
$d_5$ Inside diameter
$d_6$ Outside diameter
$d_7$ Outside diameter
$d_8$ Diameter
$d_9$ Diameter
$l_1$ Length
$l_2$ Length
x Thickness
x' Thickness
A Centre axis
B Ring width
E Reference plane
U Peripheral direction

The invention claimed is:

1. A combination comprising an implant, a dental dam and a holding device that is configured for detachably holding the dental dam on an implant end portion of the implant, the implant end portion having an implant outer surface, wherein the holding device comprises a ring which is closed on its periphery and which has a ring clamping portion that borders a ring through-opening,
wherein relative to a relaxed state of each of the ring clamping portion, the implant end portion and the dental dam, when viewed in an axial projection, an inner periphery of the ring clamping portion is larger than an outer periphery of the implant end portion and the inner periphery of the ring clamping portion is the same size as or smaller than an outer periphery of the implant end portion in combination with and surrounded by the dental dam in the relaxed state, when the dental dam lies against the outer side of the implant end portion in single ply thereon,
wherein the ring has a ring cutting section adjacent to the ring clamping portion, on which a cutting edge is formed, wherein the cutting edge lies on a geometric circle contour, and is peripherally closed, and wherein the diameter of the circle contour is smaller than the inside diameter of the ring clamping portion.

2. The combination according to claim 1, wherein the implant end portion has a rotationally symmetrical implant outer surface.

3. The combination according to claim 1, wherein relative to the relaxed state of each of the ring clamping portion, the implant end portion and the dental dam, the ring clamping portion surrounds the ring through opening circularly in an axial projection view, wherein the inside diameter of the ring clamping portion is larger than the outside diameter of the implant outer surface of the implant end portion by a diametric difference, and wherein a thickness of the dental dam is larger than or the same size as the half of said diametric difference.

4. The combination according to claim 1, wherein relative to the relaxed state of each of the ring clamping portion, the implant end portion and the dental dam, the ring clamping portion surrounds the ring through-opening circularly in at least one cross sectional plane perpendicular to the geometric ring centre axis, wherein in this cross sectional plane the inside diameter of the ring clamping portion is larger than the outside diameter of the implant outer surface of the implant end portion by a diametric difference, and wherein a thickness of the dental dam is greater or the same size as the half of said diametric difference.

5. The combination according to claim 1, wherein the ring has a predetermined break point or multiple predetermined break points in the ring clamping portion.

6. The combination according to claim 1, wherein the holding device has a handle which is fastened to the ring clamping portion and/or the ring cutting section, wherein a smallest width of the handle is larger than a smallest width of a predetermined break point in the ring clamping portion or of any given predetermined break points in the ring clamping portion.

7. The combination according to claim 1, wherein the ring is manufactured from elastically deformable material, and wherein the dental dam is manufactured from elastically deformable material.

8. The combination according to claim 1, wherein the implant has a higher modulus of elasticity and/or a greater Shore hardness and/or greater mechanical strength than the ring, and/or wherein the ring has a higher modulus of elasticity and/or greater hardness and/or greater mechanical strength than the dental dam.

9. The combination according to claim 1, wherein in cross sections of the ring perpendicular to a peripheral direction of the ring, a ring thickness as half of a difference between the outside diameter of the ring clamping portion and the diameter of the circle contour is larger or smaller than or the same size as a ring width perpendicular thereto.

10. A system comprising a combination of an implant, a dental dam and a holding device according to claim 1, wherein the dental dam surrounds the outer surface of the implant end portion along an entire periphery thereof, and wherein the ring surrounds an outside of the dental dam which surrounds the implant end portion along the entire periphery thereof, and presses the dental dam surrounding the implant end portion against the implant end portion.

11. A dental set comprising a dental tool and the combination according to claim 1, wherein the dental tool comprises a tool inner part and a tool outer part, wherein the tool inner part comprises:
a front face,
an attachment section, an outer side of which is rotationally symmetrical,
wherein the attachment section adjoins the front face,
and a first outer thread;
and wherein the tool outer part comprises:
a sleeve with a distal sleeve longitudinal end which forms a distal sleeve front face, and
a sleeve inner thread conformed on an inside of the sleeve which fits the first outer thread;
wherein an axial distance between the front face of the tool inner part and a distal longitudinal end of the first outer thread, the length of the outer thread, an axial distance between the distal sleeve longitudinal end and a proximal longitudinal end of the sleeve inner thread and a length of the sleeve inner thread are coordinated with each other in such manner that, starting from a given first position relative to the tool inner part, due to a thread engagement between the first outer thread and the sleeve inner thread by rotation of the tool outer part relative to the tool inner part, the tool outer part is movable far enough in a distal direction relative to the tool inner part that a movement of the distal sleeve longitudinal end results at least along a part of an elongated portion of the attachment section, wherein the tool inner part has a projection which extends centrally in the distal direction beyond the front face, on which projection a second outer thread is conformed, wherein the second outer thread has a smaller thread diameter compared with the first outer thread, wherein the implant has an open recess on a proximal end of the implant end portion thereof with an inner thread conformed therein, and wherein said inner thread fits the second outer thread of the tool inner part on the projection.

12. The dental set according to claim 11, wherein the thread engagement between the first outer thread and the sleeve inner thread has a greater idling torque resistance than a thread engagement between the second outer thread and the inner thread of the implant end portion.

13. The dental set according to claim 11, wherein a front face outside diameter of the attachment section corresponds to a front face outside diameter of the implant end portion.

* * * * *